US012455951B2

(12) United States Patent
Borgatti et al.

(10) Patent No.: US 12,455,951 B2
(45) Date of Patent: Oct. 28, 2025

(54) SYSTEMS AND METHODS FOR ENTANGLED AUTHENTICATION OF BIOSENSORS AND BIOSENSOR OUTPUTS

(71) Applicants: HID Global Corp., Austin, TX (US); HID Czech s.r.o., Prague (CZ); HID Global Taiwan Ltd., Taipei (TW)

(72) Inventors: Michele Borgatti, Bologna (IT); Vito Fabbrizio, Berkeley, CA (US); Marco Mancini, Prague (CZ)

(73) Assignees: HID Global Corp., Austin, TX (US); HID Czech s.r.o., Prague (CZ); HID Global Taiwan Ltd., Taipei (TW)

( * ) Notice: Subject to any disclaimer, the term of this patent is extended or adjusted under 35 U.S.C. 154(b) by 189 days.

(21) Appl. No.: 18/557,672

(22) PCT Filed: Apr. 29, 2022

(86) PCT No.: PCT/US2022/072007
§ 371 (c)(1),
(2) Date: Oct. 27, 2023

(87) PCT Pub. No.: WO2022/232833
PCT Pub. Date: Nov. 3, 2022

(65) Prior Publication Data
US 2024/0214195 A1 Jun. 27, 2024

Related U.S. Application Data

(60) Provisional application No. 63/201,463, filed on Apr. 30, 2021.

(51) Int. Cl.
*G06F 21/32* (2013.01)
(52) U.S. Cl.
CPC .................. *G06F 21/32* (2013.01)

(58) Field of Classification Search
None
See application file for complete search history.

(56) References Cited

U.S. PATENT DOCUMENTS 8,868,923 B1* 10/2014 Hamlet ................ G06F 21/00
326/8
2016/0321441 A1* 11/2016 Tonoyan ............... G06F 21/32
(Continued)

FOREIGN PATENT DOCUMENTS

WO 2022232833 11/2022

OTHER PUBLICATIONS

"International Application Serial No. PCT US2022 072007, International Search Report mailed Aug. 12, 2022", 5 pgs.
(Continued)

*Primary Examiner* — Benjamin E Lanier
(74) *Attorney, Agent, or Firm* — Schwegman Lundberg & Woessner, P.A.

(57) ABSTRACT

Disclosed herein are systems and methods for entangled authentication of biometric sensors and biometric-sensor outputs. In an embodiment, a secure-biometric-sensor system includes a biometric sensor and a secure element physically bound to one another. The sensor is communicatively interposed between a host and the secure element. The sensor receives a cryptographic challenge from the host and forwards it to the secure element. The sensor captures a biometric reading and transmits it to the host. The sensor receives, from the secure element, a challenge response that includes a shared secret between the host and the secure element. The sensor generates a cryptographically entangled token from a predetermined combination of the shared secret and data specific to the captured biometric reading, and transmits the cryptographically entangled token to the host (Continued)

for use by the host in attempting to authenticate the biometric reading as having been captured by the sensor.

21 Claims, 13 Drawing Sheets

(56) References Cited

U.S. PATENT DOCUMENTS

| | | | |
|---|---|---|---|
| 2019/0005219 A1* | 1/2019 | Matsuda | H04L 9/3231 |
| 2019/0013946 A1 | 1/2019 | Maghrebi et al. | |
| 2020/0302043 A1* | 9/2020 | Vachon | G06F 21/36 |
| 2020/0351657 A1* | 11/2020 | Wentz | H04L 9/3231 |
| 2021/0014070 A1 | 1/2021 | Gopalakrishnan et al. | |

OTHER PUBLICATIONS

"International Application Serial No. PCT US2022 072007, Written Opinion mailed Aug. 12, 2022", 6 pgs.

Papanikolaou, A, "The importance of biometric sensor continuous secure monitoring", Digital Information Management, 2008. ICDIM 2008. Third International Conference On, IEEE, (Nov. 13, 2008), 569-574.

* cited by examiner

SYSTEMS AND METHODS FOR ENTANGLED AUTHENTICATION OF BIOSENSORS AND BIOSENSOR OUTPUTS

PRIORITY APPLICATION

This application is a national stage application under 35 U.S.C. § 371 of PCT Patent Application Serial No. PCT/US2022/072007, titled "Systems and Methods for Entangled Authentication of Biosensors and Biosensor Outputs." filed Apr. 29, 2022, which claims priority to U.S. Provisional Patent Application Ser. No. 63/201,463, titled "Systems and Methods for Entangled Authentication of Biosensors and Biosensor Outputs," filed Apr. 30, 2021, each of which is incorporated by reference herein in its entirety.

TECHNICAL FIELD

Among other topics, embodiments of the present disclosure relate to sensors—including biometric sensors (also referred to as biosensors), as well as to authentication, encryption, identity protection, fraud prevention, privacy, security, and more particularly to systems and methods for entangled authentication of biometric sensors and biometric-sensor outputs.

BACKGROUND

In today's modern society, there are many times and contexts in which it is important that a device, system of devices, network, and/or the like be able to validate (i.e., confirm, verify, etc.) that a given person is who they say they are, whether that person be an employee, a customer, a particular device's own authorized user, and/or the like. The process of validating (or at least attempting to validate) identities of people (and devices) is generally known as authentication. This is distinguished from authorization, which relates to effecting controls over the particular resources to which a person and/or device, once properly authenticated, has access.

As a general matter, as is said in the industry and presented here by way of example, authentication of a person can involve the presentation by the person of one or more things that the person "knows," "has," and/or "is." Examples of things that a person "knows" (or could know) include a password, a personal identification number (PIN), an answer to one or more security questions, a frequently changing authentication code, and the like. Examples of things that a person "has" (or could have) include an access card, a smart card, a particular mobile device, and so forth. Lastly, examples of things that a person "is" (or could be) include a particular fingerprint, a particular voiceprint, a particular face (e.g., facial structure), a particular retina or pair of retinas, and the like. This is not to imply at all, of course, that a fingerprint could represent the sum of a person, but this manner of phrasing is common in the related arts.

In the context of biometric sensors, one ongoing, seemingly ever-present threat to systems that employ such sensors is the repeated attempts by nefarious actors to gain access to various resources that are protected at least in part by one or more such sensors. Such access attempts may include attempts to improperly physically enter a building or other secured space (e.g., office, lab, vault, etc.), to improperly log in to a protected system, to make an unauthorized purchase or account transfer, to acquire personal information, and/or the like. Perpetrators of such attacks typically try to appear to be valid users of the relevant system. Be they people or programs (e.g., so-called "bots"), these bad actors are persistent, constantly adjusting their attack strategies in an effort to circumvent defensive measures, which correspondingly and responsively evolve as well.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
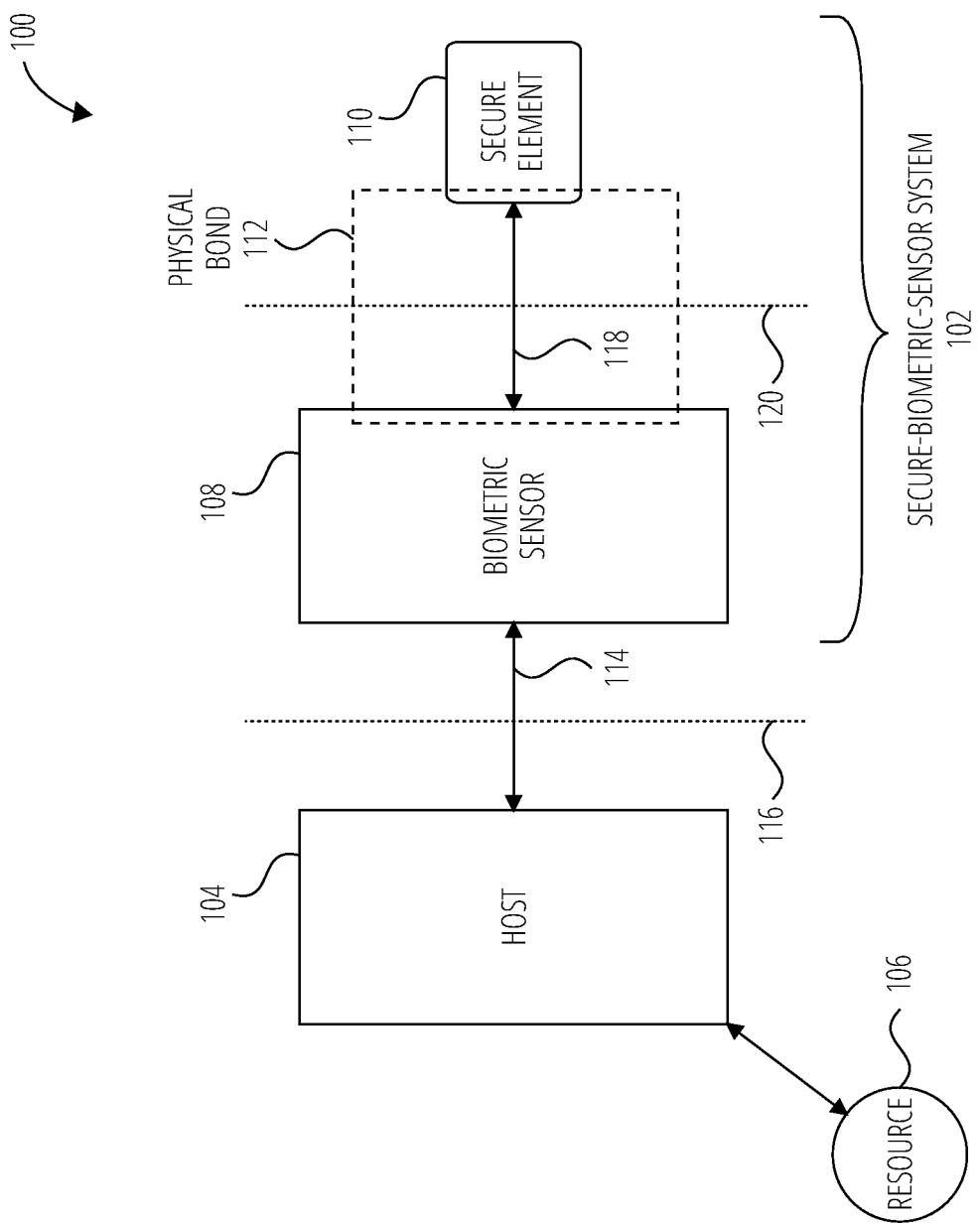
FIG. 1 depicts a first example communication arrangement, in accordance with at least one embodiment.

Various different types of biometric sensors are available in the marketplace today, and more will likely become available over time. Some example types of biometric sensors include fingerprint scanners, retinal scanners, voice-print identifiers, facial-recognition scanners, and so forth. While the present disclosure mainly discusses fingerprint scanners—also referred to herein as fingerprint sensors, this is by way of example and not limitation. Indeed, it should be understood that embodiments of the present disclosure apply equally well to other types of biometric sensors, as well as to myriad other types of sensors (e.g., temperature sensors, motion detectors, glass-break sensors, pressure sensors, proximity sensors, gas (e.g., carbon monoxide) detectors, location-determination systems, and/or the like). Validating that certain data was authentically collected by a particular sensor has value in many fields. Moreover, verifying the integrity of that data goes hand-in-hand with authentication, and that of course has significant value as well.

In many current implementations, fingerprint sensors are integrated into larger, stationary systems such as kiosks, automated teller machines (ATMs), point-of-sale devices, and the like. In such installations, it can be fairly reasonably relied upon that a given fingerprint image was collected by the fingerprint sensor that is integral to the particular device or system—one reason for this is that these stationary, physically secure systems are typically under the direct control and/or supervision of the relevant personnel (e.g., store employee, bank employee, government office employee, etc.).

Among other inspirations and motivations, embodiments of the present disclosure arose in part from the realization and recognition that it is becoming increasingly common for fingerprint sensors—that are utilized for authentication of a given person or people (for physical access, payment transactions, and the like)—to reside in mobile devices such as smartphones, tablets, laptops, netbooks, identification tokens, smart cards (e.g., smart credit cards), and the like. In a typical situation, a person may be a legitimate user that owns or has specifically been issued a smartphone (as an example mobile device). They may have purchased or leased the smartphone from a service provider or been issued the smartphone by their employer, and they or their organization (e.g., employer) may be the account holder of a subscription to a service plan for the smartphone. The person may use a fingerprint sensor that is installed in the smartphone to authorize purchases, app downloads, display of personal information (e.g., stored passwords), and/or for one or more other purposes for which authentication of identity is required to access information or cause (or allow) certain functions or transactions to proceed.

Embodiments of the present disclosure further arose from recognizing and understanding that it is often the case that fingerprint sensors in mobile devices (and some other devices) are relatively simple devices that bad actors are often successful in spoofing with prerecorded data (e.g., stored fingerprint images). It can occur that attackers gain physical access to the device in which the fingerprint sensor is installed—or into which a fingerprint sensor has been at least temporarily plugged (using, e.g., a Universal Serial Bus (USB) port). Once gaining physical access, an attacker may replace the fingerprint sensor with a different sensor and/or other electronic circuit that has been configured, programmed, and/or the like to submit such prerecorded data for authentication purposes.

This type of attack is facilitated by the typically standard and relatively simple interface between a typical host (e.g., the example smartphone) and a typical fingerprint sensor. Moreover, the obtaining of digital samples of valid fingerprint images has often proven to be readily achievable by such attackers. This issue is only exacerbated by contexts in which a given fingerprint sensor is only loosely coupled (via, e.g., a network connection) with the host that performs the authentication (or rejection) of submitted fingerprints (or other biometric readings).

Furthermore, embodiments of the present disclosure arose from recognizing and grasping the importance of preventing successful replacement of fingerprint sensors in devices—that are used for, as examples, approving the download, transfer, display, etc. of sensitive information, approving the execution of purchases, trades, other financial transactions, and/or the like—with rogue circuits that are configured to provide prerecorded images or other data to a host for authentication (as opposed to the proper biometric sensor providing biometric data gathered "from life"—i.e., from a real, live human being that is present at and in physical contact with the sensor). This importance is heightened contexts in which these devices are mobile and/or otherwise in the hands of individual users (e.g., consumers). The replacement of fingerprint sensors by effective emulators in such devices can cause numerous identity and financial problems, as well as other types of problems, for people and organizations (e.g., businesses) alike.

In current implementations, a number of solutions have been attempted. Some such solutions involve implementing a secure, closed physical case that surrounds both the sensor and the processing system (e.g., the host that adjudicates fingerprint images as being authentic or not), as well as deactivation of the sensor and/or the entire device in response to detection of physical tampering. Another approach that is used in some current implementations is to integrate into the sensor what is known as a physically unclonable function (PUF), and to use that integrated PUF to authenticate the sensor. This approach is costly at least in terms of chip area (i.e., silicon real estate), and it is also the case that PUF-based authentication has been shown to be vulnerable to being broken by attackers. Moreover, security certification of PUF-based authentication often proves problematic.

To address these and other shortcomings of prior implementations, disclosed herein are embodiments of systems and methods for entangled authentication of biometric sensors and biometric-sensor outputs. In embodiments of the present disclosure, a biometric sensor (e.g., a fingerprint sensor) is physically bound to—e.g., molded to the same package substrate as—what is known as a secure element. Further description is provided below regarding, in various different embodiments:

example communications and functions that are engaged in by a host to which a given (e.g., solid-state) biometric sensor (or secure-biometric-sensor system) is communicatively connected;

example communications and functions that are engaged in by the biometric sensor (or secure-biometric-sensor system); and example communications and functions that are engaged in by the secure element.

In order to spare the reader innumerable references to "a biometric sensor (or system)," "a biometric sensor (or secure-biometric-sensor system)" and the like, in the balance of this disclosure, references to "a biometric sensor" should—unless explicitly stated otherwise or dictated by context—be read as references to "a biometric sensor, a secure-biometric-sensor system, a biometric sensor as part of such a system, and/or the like."

Turning now to secure elements, as is known in the art, a secure element often takes the form of a relatively small integrated circuit (IC) that has a communication interface that is comparatively simple (e.g., two wires (or pins, or pads, etc.)) in the field of ICs. Moreover, in embodiments of the present disclosure, the biometric sensor is communicatively interposed between a host, which conducts the validation of the biometric readings (e.g., fingerprint images), and a secure element. The biometric sensor is communicatively connected to the host via a first communication interface, and to the secure element via a second, separate communication interface that is private to the biometric sensor (i.e., not directly available to the host but only indirectly available to the host by way of the biometric sensor). Thus, one advantage of embodiments of the present disclosure is that, to the host, a secure-biometric-sensor system (containing a biometric sensor and a secure element) of embodiments of the present disclosure presents at least physically and communication-protocol-wise as a conventional biometric sensor.

Moreover, in recent times, low-cost, serial-interface secure elements have arisen as an effective technological component with which a cryptographic identity can be assigned to a given device or other system, where that cryptographic identity can be proven and verified using one or more cryptographic protocols, as further discussed herein. As stated above, a given secure element often takes the form of a low-pin-count IC—typically as a bare silicon die or in the form of chip-scale packaging (CSP), which is a type of IC package that is defined by industry standards such as J-STD-012, which is entitled "Implementation of Flip Chip and Chip Scale Technology," and which is promulgated by an industry organization known as IPC.

In various different embodiments, the communication interface that is employed between the biometric sensor and the secure element operates according to a protocol (or format) such as Inter-Integrated Circuit ("I²C" or "I2C"), whereas the separate, independent interface between the biometric sensor and a given host operates according to a protocol such as USB, Serial Peripheral Interface (SPI), Ethernet, Wi-Fi, Bluetooth, infrared, RF, and/or the like. As a general matter, the two interfaces could use the same or different protocols, either or both of which could be any protocol(s) deemed suitable by those of skill in the art for a given implementation or in a given context.

In some embodiments, the sensor die (i.e., the die on which the fingerprint-sensor components are located) has dedicated connections to interface the secure element using a simple one-wire or two-wire interface (using, e.g., I²C), and in some embodiments has the capability of performing some cryptographic calculations in order to generate what are known as message authentication codes (MACs), which could be of any of a number of types of MACs that are used in the art. As one example, the MACs could be hash-based MACs (HMACs), which are also referred to at times in the art as "keyed-hash MACs," and which are typically produced by processing a given message or other data using a cryptographic hash function together with a secret key.

As a second example, the MACs could be of a type that are based on a block cipher. For example, the MACs could be cipher-block-chaining MACs (CBC-MACs), which involve an encryptor using a block cipher to generate a "chain" of blocks where, to encrypt a given block, the encryptor has to have properly encrypted the previous block, thus forming a chain. This property—i.e., that each block (other than the first) depends on its immediately preceding block—provides a type of security in which any change to any of the plaintext bits of the message (or fingerprint image, etc.) alters the final block in the chain in an unpredictable and irreversible way, such that a decryptor would need to have the encryption key to successfully decrypt the message.

As a note to the reader, in the present disclosure, whether a given key is used at a given moment to encrypt a message or to decrypt a message, that key is referred to in both contexts as an "encryption key" (rather than a potentially confusing usage of both "encryption key" and "decryption key" to label the same value differently at different times, or unintentionally obfuscate whether they are indeed the same value, and so forth). Encryption keys are also referred to herein at times as "session keys," "ephemeral session keys," and the like.

As described above, in some embodiments, a biometric sensor communicates with a host via a first communication interface (using, e.g., USB or SPI). In addition to using that interface to read out fingerprint images and to configure the biometric sensor's operational registers, a host may also use that first interface in accordance with the present disclosure to avail itself of one or more of a number of authentication processes that are supported in various different embodiments by the biometric sensor itself, and by the biometric sensor leveraging capabilities of the secure element. Among other example authentication processes that could be listed here, a biometric sensor of embodiments of the present disclosure may support one or more of the following:

1. authenticating a biometric sensor itself (i.e., as a device) to a host;
2. authenticating a fingerprint image read from a biometric sensor, thereby inherently and simultaneously authenticating the biometric sensor itself, and
3. authentication process #2 listed just above, in a manner in which at least the relevant communication between the sensor and the host is encrypted (using, e.g., an ephemeral session key), where an example of the relevant communication is the communication that includes the print that is actually being submitted for authentication (as opposed to, for example, an administrative function such as pixel-array calibration).

With respect in particular to the first of the three above-listed authentication processes—a biometric sensor authenticating itself as a device to a host, a given host may utilize that process periodically, for example after every certain number of images, on-demand from a user, in response to detecting the occurrence of a set of one or more specified triggering events, and/or the like. It should be understood, however, that, in at least one embodiment, the first above-listed authentication process may be superfluous if every image capture involves authentication of the image itself (e.g., utilization of either the second authentication process or the third authentication process)—in at least one embodiment, this (i.e., whether or not to keep authentication on for every image) is at the discretion of the host.

Moreover, it is noted that, even in embodiments in which the host is authenticating "every" image from the biometric sensor, there still may be interstitial images that are not authenticated. For example, some images that may not be authenticated even when the host has configured the biometric sensor to authenticate "every" image include, for example, images that may be captured and used not for authentication, but for another purpose such as calibration (e.g., focusing) of the pixel array that is capturing the fingerprint images. Such "calibration images" as they are called herein may simply be silently discarded by the host and/or by the biometric sensor. In some cases, calibration images may be used in a sort of forward-feedback loop in which the host iteratively adjusts settings written to one or more registers of the biometric sensor in order to bring into focus the image that will ultimately be the subject of an attempted authentication. Other approaches may be used as well.

Thus, embodiments of the present disclosure greatly enhance the security of sensors such as fingerprint sensors in a way that is efficient, that is low-cost, and that does not require significant modification of either the host or the sensor. Embodiments of the present disclosure provide a significant increase in the security of biometric readings at least by—again using fingerprint images by way of example—combining image-sourced data and cryptographic-response-sourced data together on the sensor side in a manner that is not separable in any intelligible way unless and until the host, having a cryptographic arrangement that parallels the cryptographic arrangement on the sensor side, receives and processes the cryptographically entangled image and cryptographic data on the host side.

The image data and cryptographic-identity-proving data is enmeshed and entangled on the sensor side, and that entangled data is then used, still on the sensor side, as an input into at least one cryptographic process or function (e.g., hashing, encrypting, and/or the like). The verification (e.g., successful hash-result comparison, successful decryption, etc.) of this cryptographically entangled data on the host side confirms to the host that the associated image was indeed captured from life by that particular biometric sensor. It is in this way that authenticating a given image inherently and simultaneously authenticates that image as having been captured by that sensor. Further details regarding various embodiments are described throughout this disclosure. Among the advantages of embodiments of the present disclosure is the combination of data transfer and authentication into a single process (e.g., set of operations). Various embodiments effect this and other advantages in a way that leverages low-cost secure elements that are readily available in the marketplace.

It should be understood that, in addition to fingerprint images, the sensor-gathered data that a given fingerprint sensor in a given embodiment collects can include what is known in the art as "liveness data." The purpose of collecting this data is to attempt to verify that the collection of the fingerprint image occurred from a real finger of a real, live person present at the sensor. This data could include measurements of skin temperature, pulse (i.e., heartbeat), blood pressure, pulse oximetry, perspiration, electrical conductance, and/or the like. In some cases, one or more machine-learning models may be trained to classify fingerprints as "live" or "not live," and that classification result (and/or an associated confidence score, etc.) could be used as part of authentication. Thus, as used herein, terms and phrases such as "image data," "fingerprint image data," "fingerprint images," "sensor data," and the like should be understood to encompass liveness data in at least one embodiment. As such, in at least one embodiment, fingerprint-liveness data is included in the data that is enmeshed and entangled on the sensor side for verification on the host side.

Moreover, in addition to the inextricability of the image data from the authentication data, embodiments of the present disclosure also enhance security due to the physical bonding of the biometric sensor and the secure element to one another as part of a secure-biometric-sensor system. Not only can the host rely on an informationally successful authentication demonstrating that the associated image was captured from life by the correct sensor, the host's reliance is buttressed by the fact that, in at least some embodiments, the biometric sensor and the secure element are solidly and robustly part and parcel of a single physical assembly. Having the biometric sensor and the secure element (e.g., molded) together in a single physical package is, in and of itself, an aspect that enhances security. Indeed, in at least some embodiments, it would be exceedingly difficult (if not impossible) to separate the biometric sensor from its secure-element companion without disabling the functionality of the secure-biometric-sensor system itself.

Embodiments of the present disclosure further have the advantage of utilizing only a small amount of substrate area in a context in which area is at a premium. Indeed, in this context, cost is measured in many instances on a money- (e.g., dollar)-per-square-millimeter-(mm) basis. Not only that, but there are often physical-size constraints (e.g., the surface area of a typical fingerprint) present in many contexts. Furthermore, high-powered elements such as extra memory modules and the like are not necessary. These aspects make embodiments of the present disclosure not only more streamlined but also less expensive and less burdensome to produce than some alternative approaches may be.

Moreover, the convenience and security provided by embodiments of the present disclosure is enhanced by the above-described arrangement in which the biometric sensor is communicatively interposed between the host and the secure element. Not only does this keep the communication interface structurally the same (as in prior implementations) between the host and the biometric sensor in some embodiments, but it also ensures that, as between the host and the biometric sensor, only the biometric sensor can communicate directly with the secure element in at least some embodiments. The host can, in such embodiments, therefore, rely on the fact that any communication that evidences proper involvement of the correct secure element has necessarily also flowed through and from the correct biometric sensor. The inseparability of the cryptographically altered image data and cryptographic-authentication data further confirms that the correct secure element was involved via the correct biometric sensor. Further aspects of a number of embodiments are described throughout this disclosure.

One embodiment takes the form of a secure-biometric-sensor system that includes a secure element and a biometric sensor that are physically bound to one another. The biometric sensor is configured to be communicatively interposed between a host and the secure element. The biometric sensor includes logic that, when executed by at least one hardware processor of the biometric sensor, causes the biometric sensor to perform operations that include receiving a cryptographic challenge from the host, forwarding the cryptographic challenge to the secure element, capturing a biometric reading using a biometric-sensing element, and transmitting the captured biometric reading to the host. The operations also include receiving, from the secure element, a cryptographic response that has been calculated by the secure element based on the cryptographic challenge, and that includes a shared secret between the host and the secure element. The operations additionally include generating a cryptographically entangled token from a predetermined combination of reading-specific data and the shared secret, where the reading-specific data includes one or both of the biometric reading and data derived from the biometric reading. The operations further include transmitting the cryptographically entangled token to the host for use by the host in attempting to authenticate the captured biometric reading as having been captured by the biometric sensor.

Another embodiment takes the form of a biometric sensor that includes first and second communication interfaces via which the biometric sensor is configured to be communicatively interposed between a host and a secure element. The biometric sensor and the secure element are physically bound to one another. The biometric sensor also includes logic that, when executed by at least one hardware processor of the biometric sensor, causes the biometric sensor to perform operations that include receiving a cryptographic challenge from the host, forwarding the cryptographic challenge to the secure element, capturing a biometric reading using a biometric-sensing element, and transmitting the captured biometric reading to the host. The operations also include receiving, from the secure element, a cryptographic response that has been calculated by the secure element based on the cryptographic challenge, and that includes a shared secret between the host and the secure element. The operations additionally include generating a cryptographically entangled token from a predetermined combination of reading-specific data and the shared secret, where the reading-specific data includes one or both of the biometric reading and data derived from the biometric reading. The operations also include transmitting the cryptographically entangled token to the host for use by the host in attempting to authenticate the captured biometric reading as having been captured by the biometric sensor.

Still another embodiment takes the form of a method that is performed by a biometric sensor executing stored instructions. The method includes receiving a cryptographic challenge from a host, where the biometric sensor is communicatively interposed between the host and a secure element. The biometric sensor and the secure element are physically bound to one another. The biometric sensor forwards the cryptographic challenge to the secure element, captures a biometric reading using a biometric-sensing element, and transmits the captured biometric reading to the host. The biometric sensor also receives, from the secure element, a cryptographic response that has been calculated by the secure element based on the cryptographic challenge. The cryptographic response includes a shared secret between the host and the secure element. The biometric sensor generates a cryptographically entangled token from a predetermined combination of reading-specific data and the shared secret, where the reading-specific data includes one or both of the biometric reading and data derived from the biometric reading. The biometric sensor transmits the cryptographically entangled token to the host for use by the host in attempting to authenticate the captured biometric reading as having been captured by the biometric sensor.

As described herein, one or more embodiments of the present disclosure take the form of a method that includes multiple operations. One or more other embodiments take the form of a system that includes at least one hardware processor and that also includes one or more non-transitory computer-readable storage media containing instructions that, when executed by the at least one hardware processor, cause the at least one hardware processor to perform multiple operations (that in some embodiments do and in other embodiments do not correspond to the set of operations performed in a herein-disclosed method embodiment). Still one or more other embodiments take the form of one or more non-transitory computer-readable storage media containing instructions that, when executed by at least one hardware processor, cause the at least one hardware processor to perform multiple operations (that, again, in some embodiments do and in other embodiments do not correspond to the set of operations performed in a herein-disclosed method embodiment and/or the set of operations performed by a herein-disclosed system embodiment).

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment and/or a non-transitory-computer-readable-storage-media embodiment. Furthermore, this flexibility and cross-applicability of embodiments is present in spite of any slightly different language (e.g., processes, process flows, methods, methodologies, steps, operations, functions, and/or the like) that is used to describe and/or characterize such embodiments and/or any element or elements thereof.

FIG. 1 depicts an example communication arrangement 100, in accordance with at least one embodiment. As shown in FIG. 1, the communication arrangement 100 includes a secure-biometric-sensor system 102 and a host 104, the latter of which controls access to a resource 106. It is noted that the resource 106 is intentionally presented generically, and could represent a physical space, a computer system, an online resource, personal information (e.g., medical, financial information, etc.) of one or more users, and/or the like. In the described example, the host 104 grants or denies access to the resource 106 based on communication that the host 104 has with the secure-biometric-sensor system 102, and based also on processing that the host 104 itself does with information that it receives from the secure-biometric-sensor system 102. In some implementations, the host 104 simply grants access if it determines that the instant fingerprint is authentic and otherwise denies access. In other implementations, the host 104 may similarly grant access for presentation of authenticated fingerprints, but then treat cases in which an authentication is not successfully made right away by offering another chance, challenging the person for additional information, etc.

The host 104 may be or include a microcontroller, microprocessor, and/or the like (e.g., ARM CM4, ARM CM7, ARM Cortex A9, and/or the like). As a general matter, the host 104 could be any computing-and-communication device that is suitably equipped and configured (e.g., programmed) to perform the host operations as described herein, or any combination of devices that collectively perform the host operations. The secure-biometric-sensor system 102 and the host 104 could be located in a common geographic location, even in a single computing device (e.g., a smartphone) or other housing, though this is not required. In general, the secure-biometric-sensor system 102 and the host 104 may be separated by any arbitrary distance, and may communicate with one another via one or more networks.

The communication between the secure-biometric-sensor system 102 and the host 104 could be wired and/or wireless. In the examples that are primarily discussed herein, the host 104 and the secure-biometric-sensor system 102 are connected via a wired serial interface such as USB, SPI, and/or the like. Moreover, in the examples that are primarily described herein, among the components of the secure-biometric-sensor system 102, it is a biometric sensor 108 with which the host 104 directly communicates. In addition to the biometric sensor 108, the secure-biometric-sensor system 102 also includes a secure element 110, and the biometric sensor 108 and the secure element 110 are physically bound together by a physical bond 112.

Like the resource 106, the physical bond 112 is intentionally presented generically: any suitable physical bond between the biometric sensor 108 and the secure element 110 could be used in a given embodiment. As one example, in some embodiments, the physical bond 112 takes the form of or at least includes a common package substrate to which both the biometric sensor 108 and the secure element 110 are molded. In some embodiments, the biometric sensor 108 and the secure element 110 are on separate dies that are then bonded together (using die-to-die bonding) in a manner known in the art. In at least one embodiment, the physical bond 112 is tamper-resistant, such that separating the biometric sensor 108 from being physically bound to the secure element 110 will render the secure-biometric-sensor system 102 inoperative.

The host 104 and the biometric sensor 108 are depicted as communicating via what is referred to herein as a host↔sensor communication path 114 across what is referred to herein as a host/sensor interface 116. As discussed, this communication could be over a serial interface, and could also be over a parallel interface (e.g., camera interface), over a network connection, and so forth. A wireless interface such as Bluetooth or Wi-Fi could be used as well. Moreover, the biometric sensor 108 and the secure element 110 are depicted as communicating via what is referred to herein as a sensor↔secure-element communication path 118 across what is referred to herein as a sensor/secure-element interface 120. The communication between the biometric sensor 108 and the secure element 110 could be according to a protocol such as I²C or another suitable protocol.

The secure element 110 may be an IC (e.g., a commercial product such as the NXP A1006) that contains one or more secrets and one or more private keys that give a unique cryptographical identity to the secure element 110, and therefore to any device such as the biometric sensor 108 that is inextricably tied to the secure element 110. This unique cryptographical identity may be able to be verified using a challenge-response paradigm, among other possible options known to those of skill in the art. Moreover, the secure element 110 may store a digital certificate that is cryptographically signed by an appropriate entity, such as a manufacturer of the secure-biometric-sensor system 102, for example. In at least one embodiment, the host 104 also stores a copy of the digital certificate of the secure element 110 for use in validating one or more data blocks that have been digitally signed by the secure element 110 using its digital signature. In some embodiments, the host 104 may have its own secure element (not depicted).

In at least one embodiment, the biometric sensor 108 serves as the controlling component and the secure element 110 serves as the corresponding controlled component with respect to communication that takes place across the sensor/secure-element interface 120. This type of relationship is referred to in the art at times as being a "master-slave" relationship, but the language "controlling component" and "controlled component" are used instead in the present disclosure. The biometric sensor 108 may provide a serial clock for synchronization of communication between the biometric sensor 108 and the secure element 110. In a somewhat similar fashion, in at least one embodiment, the host 104 plays the role of the controlling component and the biometric sensor 108 plays the role of the controlled component with respect to communication that takes place across the host/sensor interface 116.

In various different embodiments and in various different circumstances, the host 104 may elect or be instructed to operate in a mode in which, for at least some amount of time, the host 104 simply reads unauthenticated fingerprints, and may further have a mode in which it authenticates all fingerprints. Furthermore, the host 104 may also or instead have modes in which it authenticates some but not all fingerprints, operating such that it, as examples, authenticates one or more fingerprints every fixed amount of time, every fixed number of fingerprint scans, on a random basis, depending on what resource is being requested, and/or according to one or more other such paradigms. In an embodiment, the host 104 instructs the biometric sensor 108 as to the current operating mode at least in part by writing certain values and/or commands to one or more registers or other storage elements in the biometric sensor 108. These registers may be dedicated to authentication-related tasks, and accordingly are referred to herein as "authentication registers."

In some embodiments, it is the case that, in some circumstances (e.g., every fixed amount of time, one of the other examples given just above, or another approach), the host 104 instructs the biometric sensor 108 to authenticate itself to the host 104. Prior to describing such an example, it is first noted here that a number of examples are described below—in connection with various ones and/or sets of the figures—in which the host 104 validates a fingerprint image as having been captured by the biometric sensor 108. This next example, however, involves the host 104 requesting that the biometric sensor 108 validate just itself as a device. And it is noted that the biometric sensor 108 could also or instead initiate such a process.

To be prepared to authenticate the biometric sensor 108 (or the secure-biometric-sensor system 102) as a device, the host 104 may have stored therein a copy of a digital certificate that is particular to the secure element 110. This certificate may also be used for other purposes, including validating a digital signature on image data sent from the biometric sensor 108 to the host 104, as discussed below. Returning to the present example of authenticating the biometric sensor 108 as a device, the host 104 may begin by sending a read command to the biometric sensor 108 across the host/sensor interface 116, and that read may be redirected by the biometric sensor 108 to the secure element 110. The host 104 may then send a cryptographic challenge (e.g., a random number together with a multiplier, a point on a specific elliptic curve, and/or the like—depending on, perhaps among other factors, the technical capabilities of a given secure element) to the biometric sensor 108, which the biometric sensor 108 similarly redirects to the secure element 110.

The biometric sensor 108 may be configured with logic—referred to herein as "sensor authentication logic"—that the biometric sensor 108 may execute to perform these and numerous other operations as described herein. The secure element 110 may calculate a response to the issued challenge, and communicate that response to the biometric sensor 108, which may then transmit that response to the host 104. The host 104 can then verify the authenticity of the response and thereby authenticate the biometric sensor 108 as a device. The biometric sensor 108 may then redirect reads (conducted by the host 104) back to itself—i.e., back to the biometric sensor 108. The secure element 110 may also use its digital certificate to digitally sign the response, and the host 104 can use its copy of that certificate to validate that as well. A process such as this, of authenticating the biometric sensor 108 to the host 104 as a device, may take on the order of 60 milliseconds (ms), the vast majority (~50 ms) of which may be spent by the secure element 110 calculating the response to the challenge.

Other examples involving image authentication (and therefore inherently involving sensor authentication are described below. It is noted that authentication by the host 104 of the biometric sensor 108 as a device is useful to an extent, but may still leave the host 104 vulnerable to, as an example, attacks in which a malicious actor steps in between the host 104 and the biometric sensor 108 and sends prerecorded fingerprint images to the host 104 as if such images are coming from the biometric sensor 108—spoofing the biometric sensor 108. This is among the problems addressed by the embodiments of the present disclosure in which the fingerprint images themselves are authenticated by the host 104, which inherently authenticates the biometric sensor 108 as a device to the host 104 as well—in particular the host 104 authenticates the validated image as having been captured by the biometric sensor 108.

Figure 2:
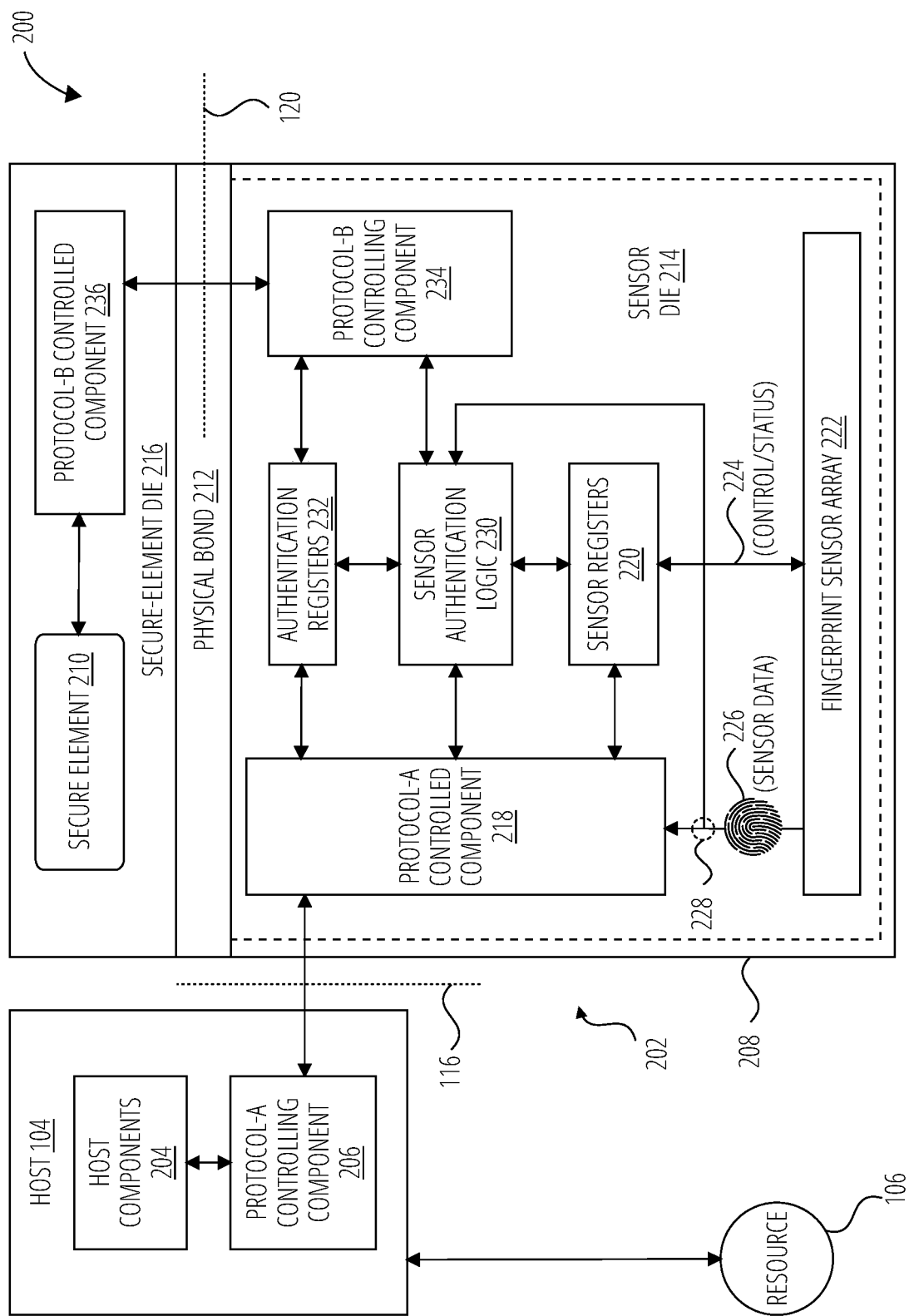
FIG. 2 depicts a second example communication arrangement, in accordance with at least one embodiment.

FIG. 2 depicts an example communication arrangement 200, in accordance with at least one embodiment. Similar to the communication arrangement 100 of FIG. 1, the communication arrangement 200 of FIG. 2 includes the host 104 and the resource 106, as well as the host/sensor interface 116 and the sensor/secure-element interface 120 (as mapped on to the communication arrangement 200). The host 104 includes host components 204 and a protocol-A controlling component 206. The host components 204 are meant as a general, catch-all representation of components of the host 104 such as memory, other data storage, one or more processors, one or more other communication interfaces, possibly a user interface, and the like. The particular details of the internal architecture of the host can vary from implementation to implementation.

The communication arrangement 200 further includes a secure-biometric-sensor system 202, which itself includes (i) a biometric sensor 208 that includes a sensor die 214 and (i) a secure-element die 216 that are physically bound to one another by a physical bond 212, which could be an implementation of die-to-die bonding, as is known to those of skill in the art. The sensor die 214 includes a protocol-A controlled component 218, sensor registers 220, a fingerprint sensor array 222, sensor authentication logic 230, authentication registers 232, and a protocol-B controlling component 234. Using SPI as an example protocol for communication between the host 104 and the secure-biometric-sensor system 202 across the host/sensor interface 116, the protocol-A controlling component 206 may be an SPI controlling component and the protocol-A controlled component 218 may be an SPI controlled component.

The sensor registers 220 and the fingerprint sensor array 222 may exchange control-and-status messages 224. In connection with a given scan of a given fingerprint, the fingerprint sensor array 222 may transmit a fingerprint image 226 (labeled generally as "sensor data" in FIG. 2) to the protocol-A controlled component 218, and a copy of the fingerprint image 226 may also be transmitted to the sensor authentication logic 230 by way of a junction 228. The protocol-A controlled component 218 may be in communication for various purposes as described herein with the sensor registers 220, the sensor authentication logic 230, and the authentication registers 232.

In addition to receiving the fingerprint image 226 from the fingerprint sensor array 222 and in addition to being in communication with the protocol-A controlled component 218 as described, the sensor authentication logic 230 may also be in communication with the sensor registers 220, the authentication registers 232, and the protocol-B controlling component 234. Moreover, in addition to being in communication with the protocol-A controlled component 218 and the sensor authentication logic 230 as described, the authentication registers 232 may be in communication with the protocol-B controlling component 234.

Furthermore, as described, the protocol-B controlling component 234 may be in communication with the sensor authentication logic 230 and the authentication registers 232, but also with a protocol-B controlled component 236 that is resident on the secure-element die 216 along with a secure element 210. Using $I^2C$ as an example protocol for communication between the biometric sensor 208 and the secure element 210, the protocol-B controlling component 234 may be an $I^2C$ controlling component and the protocol-B controlled component 236 may be an $I^2C$ controlled component. Moreover, although the secure element 210 and the protocol-B controlled component 236 are shown as separate entities for illustration in FIG. 2, the secure element 210 may itself be (in part) a controlled component according to $I^2C$ and/or one or more other protocols.

The fingerprint sensor array 222 may be a pixel array or other sensing array and/or element, as is known in the art. The sensor registers 220 may be settable with various values by the host 104 to configure the fingerprint sensor array 222 to operate in various different ways and modes. The authentication registers 232 may be used as a resource by the sensor authentication logic 230 and the secure element 210 via the protocol-B controlling component 234 and the protocol-B controlled component 236 for the performance of various authentication-related tasks and functions as described throughout this disclosure. In different implementations, various different ones of the authentication registers 232 could be used in roles such as control registers, status registers, data registers, and/or the like.

In operation, the secure-biometric-sensor system 202 may, by way of execution of the sensor authentication logic 230, perform one or more of the sets of operations described herein; for example, the secure-biometric-sensor system 202 may be configured (e.g., programmed) to perform the method 1100 and the many variations described herein. Those functions are further described in other parts of this disclosure, including in connection with a number of the ensuing figures. It is noted that, as depicted in FIG. 2, a two-die-integration scheme in a unitary molded module results in a secure and cost-effective secure-biometric-sensor system. sensor module. The fingerprint sensor array 222 and the sensor authentication logic 230 could be implemented on a field programmable gate array (FPGA), and the secure element 210 could be a product such as an NXP A1006, as an example. Many other example implementations could be listed here as well, including implementations in which dedicated hardware is used to implement some or all of the sensor authentication logic 230, and also including implementations in which the biometric sensor 208 and the secure element 210 are arranged in a configuration that is on a single die or that uses die-to-die bonding, as examples.

In various different embodiments, among other advantageous functions, the sensor authentication logic 230 enables the conducting of both authentication and image readout via the same physical lines (e.g., SPI), dispatches non-authentication-related commands and data to components of the biometric sensor 208 such as the sensor registers 220 and the fingerprint sensor array 222, dispatches authentication-related commands and data among the authentication registers 232 and the secure element 210 via the protocol-B controlling component 234 and the protocol-B controlled component 236, and provides computing resources to support image authentication, encryption, and/or the like. As to the latter point, as but a few examples, the sensor authentication logic 230 supports image authentication using one or more cryptographic hash functions in some embodiments, and supports image authentication and encryption (using, e.g., a block cipher) in some embodiments.

Figure 3:
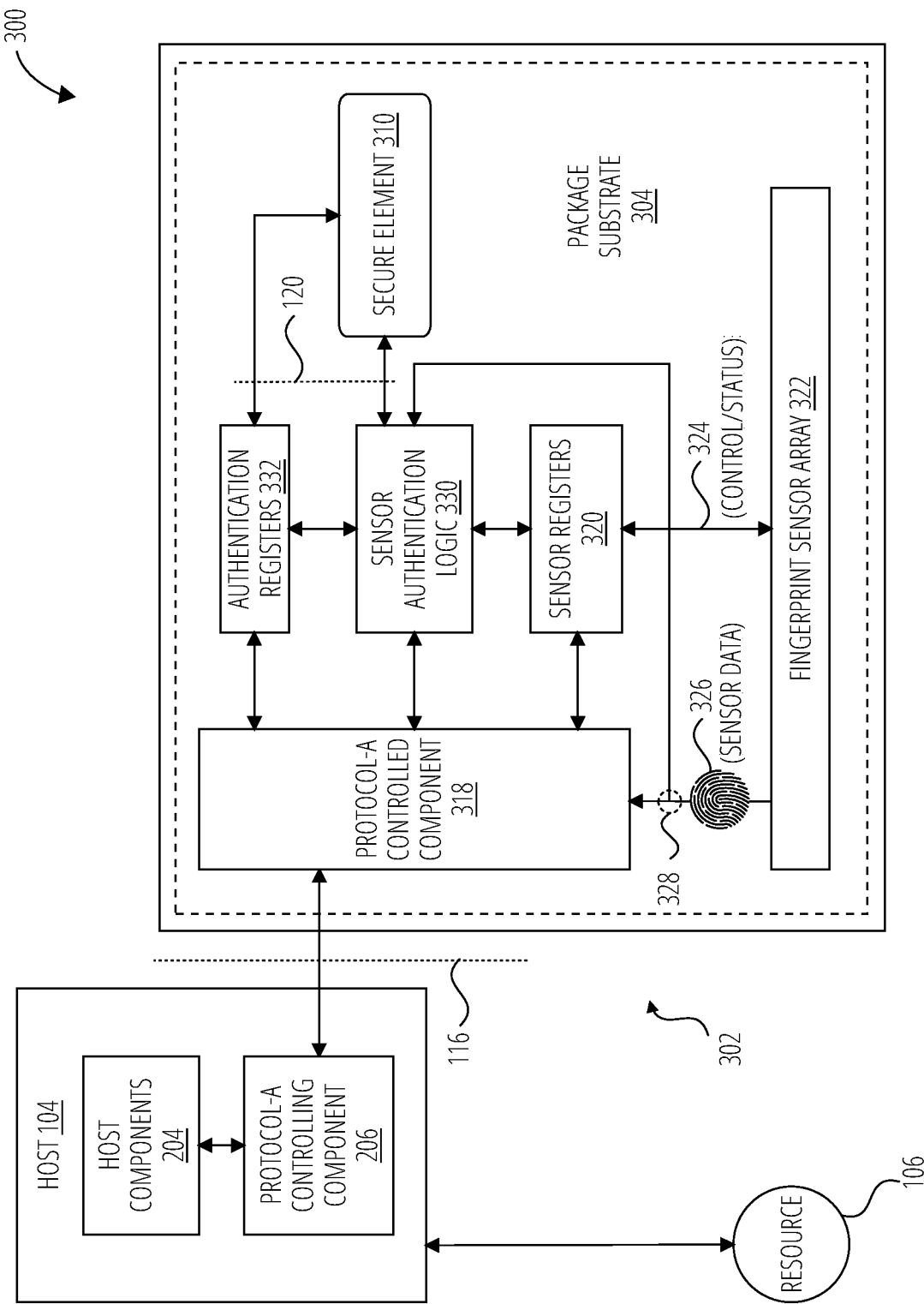
FIG. 3 depicts a third example communication arrangement, in accordance with at least one embodiment.

FIG. 3 depicts an example communication arrangement 300, in accordance with at least one embodiment. The communication arrangement 300 of FIG. 3 is similar in a number of ways to the communication arrangement 200 of FIG. 2, and therefore is not described here in as great of detail. The major difference between FIG. 2 and FIG. 3 is that, with respect to the secure-biometric-sensor system 302, the components that were shown on a separate sensor die 214 in FIG. 2 are molded on a common package substrate 304 with the secure element 310. Most other aspects are essentially the same (in at least one embodiment), but the communication across the sensor/secure-element interface 120 between (i) the sensor authentication logic 330 and the authentication registers 332 and (ii) secure element 310 occur over wired connections (e.g., wire bond) on the package substrate 304.

As is the case with a number of the figures in the present disclosure, the parallel elements are numbered similarly in different figures. Thus it can be seen that, other than the leading digit, the element numbering matches between FIG. 2 and FIG. 3 with respect to the secure-biometric-sensor system 202 (302), the protocol-A controlled component 218 (318), sensor registers 220 (320), fingerprint sensor array 222 (322), the control-and-status messages 224 (324), the fingerprint image 226 (326), the junction 228 (328), the sensor authentication logic 230 (330), the authentication registers 232 (332). This pattern of element numbering is utilized throughout the figure set where practicable.

Figure 4:
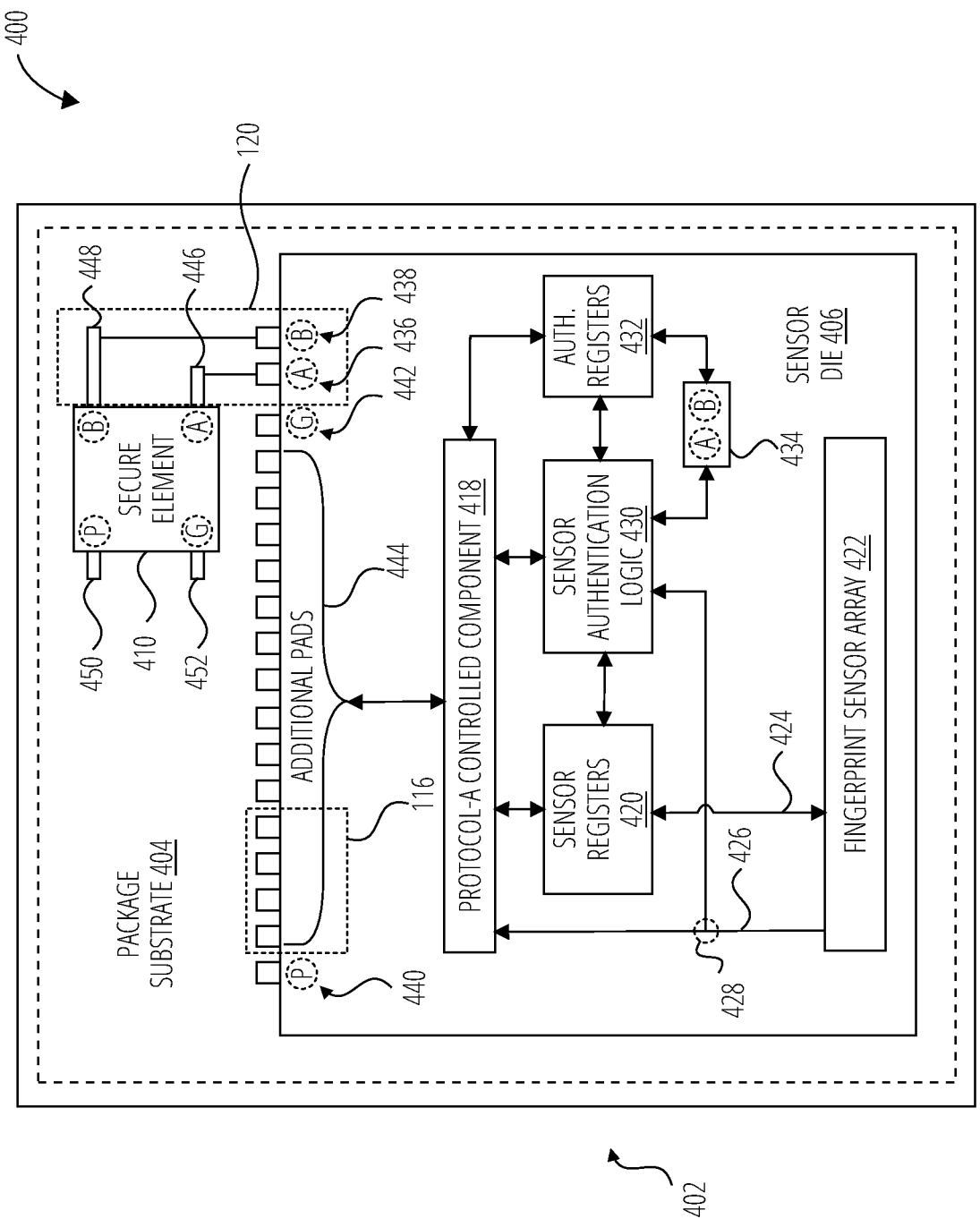
FIG. 4 depicts a first example architecture of a secure-biometric-sensor system, in accordance with at least one embodiment.

FIG. 4 depicts an example architecture 400 of an example secure-biometric-sensor system 402, in accordance with at least one embodiment. With respect to scope, the architecture 400 of FIG. 4 depicts a secure-biometric-sensor system 402, analogous to the secure-biometric-sensor system 102 of FIG. 1, the secure-biometric-sensor system 202 of FIG. 2, and the secure-biometric-sensor system 302 of FIG. 3. To simplify the presentation of FIG. 4, the host and the resource were omitted from this drawing, though that is not to say that they would not be there in an actual implementation. The elements of in FIG. 4 that are, in at least one embodiment, essentially parallels of their counterparts in FIG. 3 (and FIG. 2), and thus are not described here in extensive detail are a protocol-A controlled component 418, sensor registers 420, a fingerprint sensor array 422, control-and-status messages 424, a fingerprint image 426, a junction 428, sensor authentication logic 430, and authentication registers 432.

A secure element 410 is shown as sharing a package substrate 404 with a sensor die 406 on which the other components reside. The host/sensor interface 116 is represented in FIG. 4 as a group of four pads among a larger set of what are referred to in FIG. 4 as the additional pads 444. They are denoted as being "additional" in FIG. 4 only in that they are not among the four particularly labeled pads, which are a power pad 440, a ground pad 442, a data pad 436, and a data pad 438. The sensor/secure-element interface 120 is represented in FIG. 4 as being the points at which respective wire-bond connections join (i) the data pad 436 of the sensor die 406 to a data pad 446 of the secure element 410 and (ii) the data pad 438 of the sensor die 406 to a data pad 448 of the secure element 410. The secure element 410 also has a power pad 450 and a ground pad 452.

To show a correspondence with one another with respect to how they are interconnected, the data pads 436 and 446 are both labeled "A," and the data pads 438 and 448 are both labeled "B". It is further noted that a protocol-B controlling component 434 is depicted in FIG. 4 as being connected to the sensor authentication logic 430 and the authentication registers 432, and as also having terminals "A" and "B". Via these connections, it can be seen that the sensor authentication logic 430 and the authentication registers 432 can use the "A" and "B" terminals in the protocol-B controlling component 434 to respectively communicate with (i) the "A" data pad 446 of the secure element 410 via the "A" data pad 436 of the sensor die 406 and (ii) the "B" data pad 438 of the secure element 410 via the "B" data pad 438 of the sensor die 406.

In at least one embodiment, the sensor die 406 and the secure element 410, together with their (e.g., $I^2C$) communication channel, are in bare die form, attached to a common package substrate—i.e., the package substrate 404, and molded. In various different embodiments, the sensor die (e.g., the sensor die 406) and the secure element (e.g., the secure element 410) are connected with wire bonds or other equivalent multi-die module or system-in-package interconnection technology. The substrate with the two dice interconnected may be molded using, for example, an epoxy compound, which is a typical practice in the art of solid-state fingerprint sensor technology.

Figure 5:
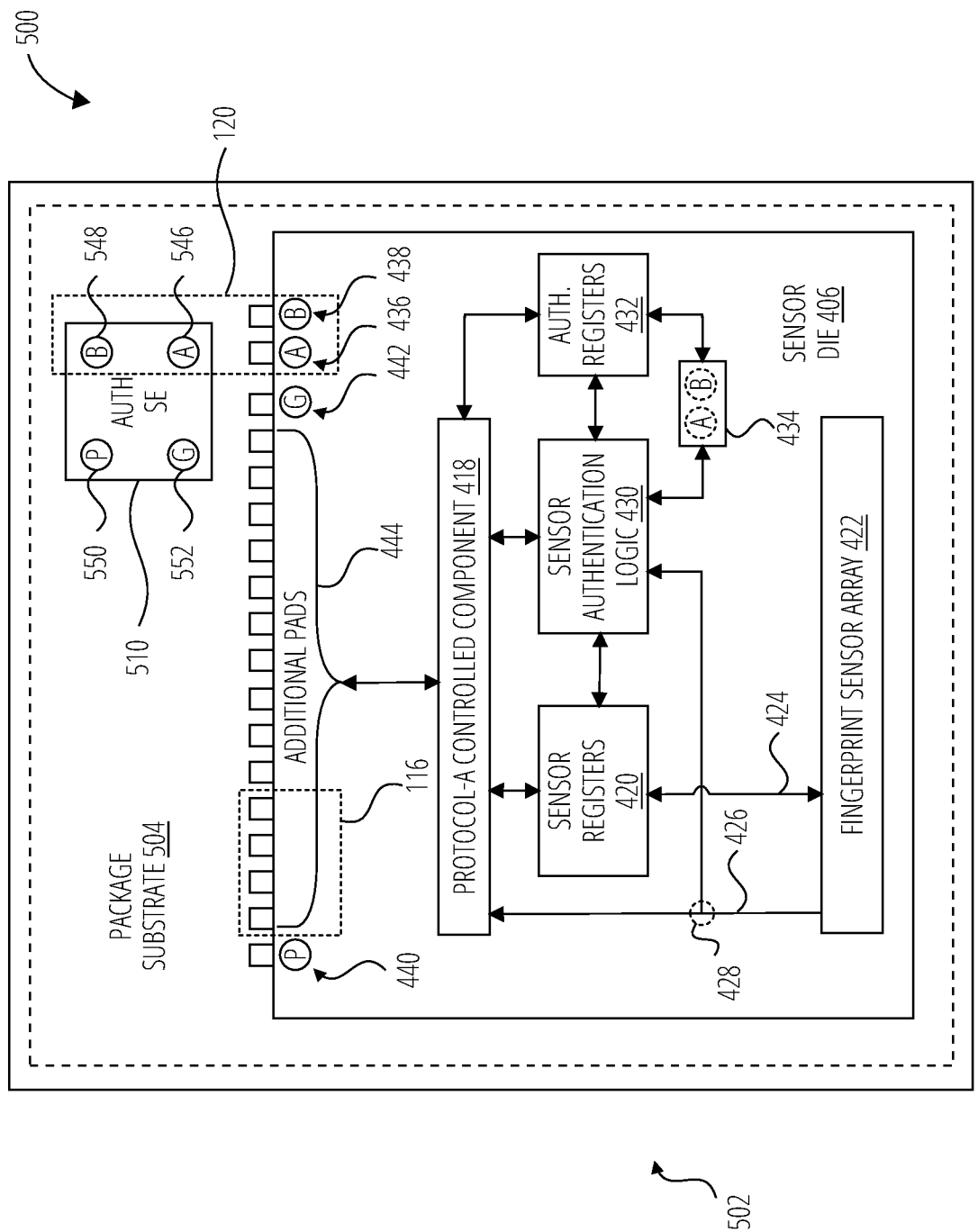
FIG. 5 depicts a second example architecture of a secure-biometric-sensor system, in accordance with at least one embodiment.

FIG. 5 depicts a slightly different architecture 500 of an example secure-biometric-sensor system 502, in accordance with at least one embodiment. The architecture 500 of FIG. 5 is quite similar to the architecture 400 of FIG. 4—indeed, the same 400-series reference numerals are used in FIG. 5. The elements that are numbered in the 500 series in FIG. 5 are the secure-biometric-sensor system 502 itself, a package substrate 504, a secure element 510, and the following four components of the secure element 510: a power solder bump 550, a ground solder bump 552, a data solder bump 546, and a data solder bump 548. These solder bumps have been deposited onto the chip pads.

Thus, instead of pads, the secure element 510 uses four soldered balls 546, 548, 550, and 552 for its connections to the package substrate 504. This is an example of what is known in the art as chip-scale packaging (CSP), which is a type of package for ICs. In an embodiment, so as to not disrupt a form factor of the associated biometric sensor, the height of the soldered CSP (with collapsed balls) is less than the height of the biometric sensor.

Figure 6:
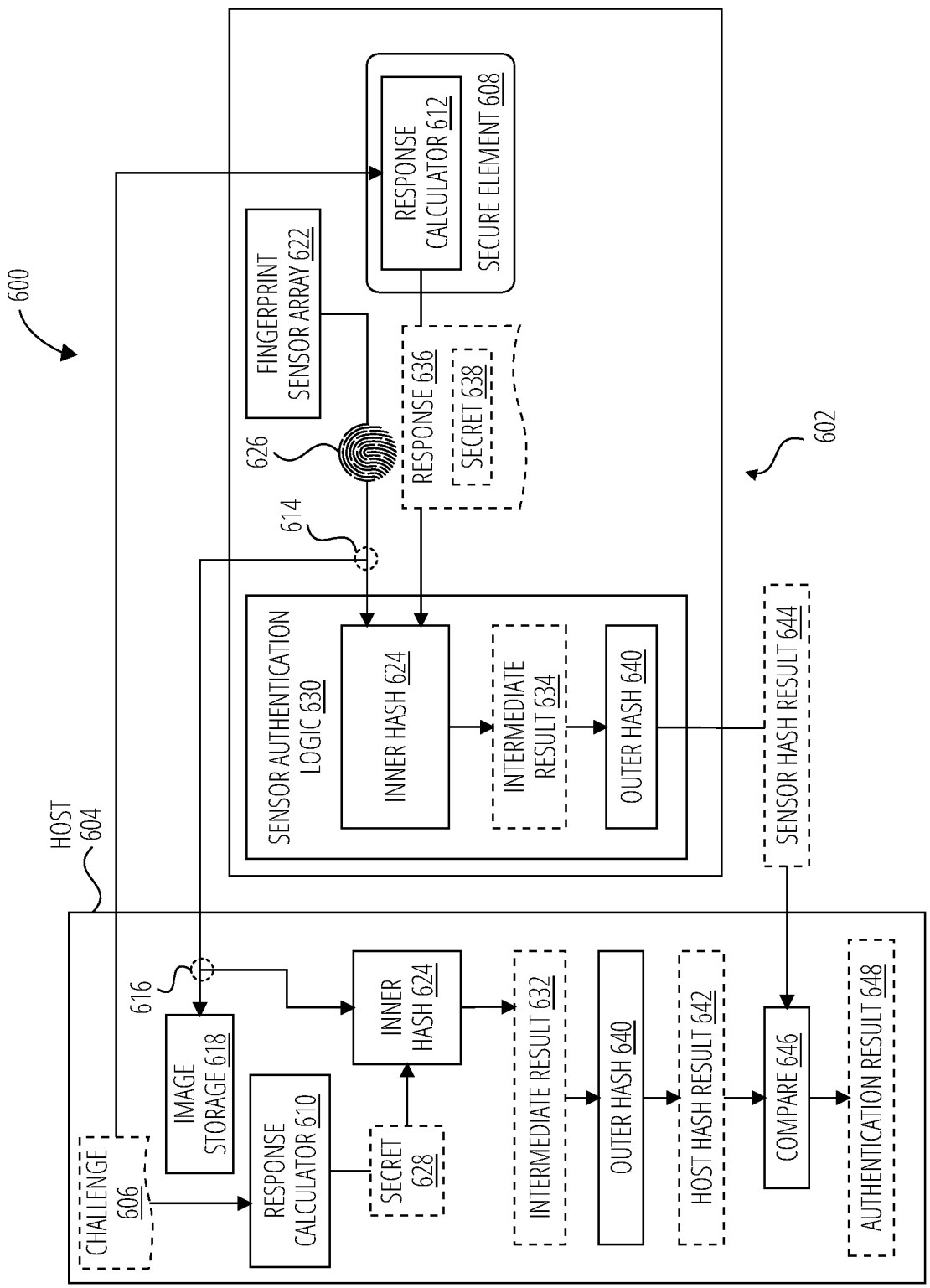
FIG. 6 depicts a first example information-flow diagram, showing an example arrangement in which an example host and an example biometric sensor both utilize multiple parallel hash functions, in accordance with at least one embodiment.

FIG. 6 depicts a first example information-flow diagram 600, showing an example arrangement in which an example host 604 and an example secure-biometric-sensor system 602 both utilize multiple parallel hash functions, in accordance with at least one embodiment. Shown in FIG. 6 are a secure-biometric-sensor system 602 and a host 604. The host 604 includes an image storage 618, a response calculator 610, an inner hash function 624, an outer hash function 640, and a compare function 646. The secure-biometric-sensor system 602 includes a fingerprint sensor array 622, a junction 614, a secure element 608 that includes a response calculator 612, sensor authentication logic 630 that includes the inner hash function 624 and the outer hash function 640. Of course the latter two are sensor-side instances of those hash functions, but they are substantively the same. In FIG. 6 and in the ensuing four figures, informational items (e.g., a cryptographic challenge 606, a cryptographic response 636, etc. are depicted using dashed outlines.

The information flow of the information-flow diagram 600 begins with the host 604 generating (e.g., calculating) the cryptographic challenge 606, and providing that cryptographic challenge 606 to both the response calculator 610 of the host 604 and the response calculator 612 of the secure element 608. Either or both of these response calculators 610 and 612, as well as other response calculators described in connection with some of the ensuing figures, may be implemented in any combination of hardware, firmware, and/or software, as deemed suitable by those of skill in the art. In some embodiments, the response calculators on the hosts are implemented in firmware and/or software, whereas the response calculators on the secure elements are implemented in hardware. The response calculator 610 calculates a secret 628 based on the cryptographic challenge 606, and will use that secret 628 as one of two inputs into what is referred to herein as the inner hash function 624.

On the sensor side, a fingerprint image 626 is read by the fingerprint sensor array 622 and transmitted via the junction 614 to both the inner hash function 624 on the sensor side and the image storage 618 on the host side. In at least one embodiment, the fingerprint image 626 is sent as cleartext between the secure-biometric-sensor system 602 and the host 604. As shown, the fingerprint image 626 is one of two inputs—the other being a secret 638 that is calculated by the response calculator 612 of the secure element 608 based on the cryptographic challenge 606, and that is transmitted to the inner hash function 624 from the secure element 608 in a cryptographic response 636.

In many instances, the latency associated with the calculation of the cryptographic response 636 by the secure element 608 is on the order of 50 ms. If the inner hash function 624 on the sensor side waiting until that calculation was complete to start its operations, that ~50-ms delay would hold up the entire process. However, in at least one embodiment, the inner hash function 624 on the sensor side starts computing hash results of blocks of data from the fingerprint image 626, building a digest that is referred to in connection with FIG. 6 as a sensor-side intermediate hash result 634. In an embodiment, once the secret 638 is ready, the sensor-side inner hash function 624 computes a result based on the secret 638.

At this point in the process, the secure-biometric-sensor system 602 has used its sensor authentication logic 630 to generate a set of data—that includes hash-function results from both the fingerprint image 626 and the secret 638. These hash-function results, however, are still two distinct sets of data, separable based on the data (either the fingerprint image 626 or the secret 638) from which they were generated using the sensor-side inner hash function 624. To enhance security even more, embodiments of the present disclosure involve then taking that combined data set (the sensor-side intermediate hash result 634) and processing it through the outer hash function 640 so as to produce what is referred to in FIG. 6 as the sensor hash result 644.

Importantly, the sensor hash result 644 is a value that has been inseparably generated from both (i) image-sourced data (in this case hash result of processing the fingerprint image 626 through the inner hash function 624 and (ii) cryptographic-authentication data (in this case the secret 638). From the value of the sensor hash result 644 itself, there is no way to tell which of those two sets of data contributed (solely) to any part of the sensor hash result 644, which is therefore an example of what is referred to in the present disclosure as a "cryptographically entangled token."

It would be analogous to taking two text documents, counting the total number of words in both documents together that start with "a," those that start with "b," and on down to those that start with "z," having a secret code word such as "horse" that is known to both sides, and then computing the product of the total number of words that start with "h," the total number of words that start with "o," the total number of words that start with "r," the total number of words that start with "s," and the total number of words that start with "e." Both sides of the encrypted channel would (one would hope) get the same answer, but there would be absolutely no way to deduce anything in particular about either document from that number alone, which would therefore be an example of a "cryptographically entangled token."

Returning to the two hash functions of the present example, the sequential operation of the two hash functions 624 and 640 can be expressed as:

$$H2([K \text{ XOR } opad][H1([\text{image data}][K \text{ XOR } ipad])])$$

where "H1" represents the inner hash function 624, "H2" represents the outer hash function 640, "K" represents the calculated secret 628 or 638, "image data" represents the fingerprint image 626, "K XOR ipad" represents the ipad slice of the calculated secret, and "K XOR opad" represents the opad slice of the calculated secret. As is known in the art, "ipad" and "opad" are known constants that essentially serve as the knives used to slice your secret. In particular, ipad is the block-sized inner padding, made up of repeated bytes equal to 0x36, whereas opad is the block-sized outer padding, made up of repeated bytes equal to 0x5c.

A similar equation represents what occurs on the host side, with the differences being of course the use of the host-side instances of the inner hash function 624 and the outer hash function 640, as well as the host-side intermediate hash result 632 instead of the sensor-side intermediate hash result 634 (though they will be substantively equal in the case of valid authentication attempts—i.e., attempts, whether they end up being granted or not, that properly involved a scan of a fingerprint from life at the secure-biometric-sensor system 602), and the secret 628 instead of the secret 638 (though again they will be substantively equal in the case of valid authentication attempts.)

The output of the host-side outer hash function 640 is labeled the host hash result 642 in FIG. 6. Using a compare function 646, the host 604 compares the host hash result 642 with the sensor hash result 644 that is received from the secure-biometric-sensor system 602. If they match, it can be concluded that the fingerprint image 626 was legitimately scanned from life at the secure-biometric-sensor system 602. Thus the authentication result 648 may be set to true upon a match and otherwise set to false. Whether or not that fingerprint image 626 is one of an authorized user of the particular system is, of course, another matter altogether.

In some embodiments, the inner hash function 624 and the outer hash function 640 are secure hash algorithms such as a Secure Hash Algorithm 256 (SHA-256) algorithm, a SHA-512 algorithm, or the like. The inner hash function 624 and the outer hash function 640 could be the same hash function run twice using the different inputs, or they could be two different hash functions. In some embodiments, the order of the inputs to the inner hash function 624 are reversed, i.e.:

$$H2([K \text{ XOR } opad][H1([K \text{ XOR } ipad][\text{image data}])])$$

It is noted that these two "separate inputs" are really the single value concatenation of the "two" inputs. Furthermore, this approach results in more latency than the previously described approach, since the calculation of "K" (i.e., the secret 638) must be completed before any further calculating can proceed. Similarly on the host side, the host 604 can get started hashing the fingerprint image 626 once it starts receiving it from the secure-biometric-sensor system 602 (in the form of, e.g., image data frames at a frame-readout rate of, e.g., typically more than 60 ms). The host will likely have its secret 628 ready much earlier than the secure element 608 will have its secret 638 ready, due to the typically lightweight processing capabilities of many secure elements.

The secure-biometric-sensor system 602 may check (e.g., after sending each frame) whether the cryptographic response 636 (containing the secret 638) is ready from the secure element 608. Once the secret 638 is ready, the secure-biometric-sensor system 602 may hash it using the inner hash function 624, accumulate it into the digest, and then hash the sensor-side intermediate hash result 634 using the outer hash function 640. Once that is completed, the secure-biometric-sensor system 602 may send the sensor hash result 644 to the host 604, perhaps on an interrupt basis or responsive to periodic polling by the host 604), among other implementation options. In some embodiments, the secure-biometric-sensor system 602 may send the sensor hash result 644 to the secure element 608 to be cryptographically signed using the digital certificate of the secure element 608, such that the digital signature could be verified as well by the host 604 as an additional measure of security. Moreover, in at least one embodiment, whether hash functions or encryption (as described more fully below) or another cryptographic approach is being used, it is the entire image that is processed using the relevant cryptographic function(s) such that it can be concluded on the host side that a complete match of the full image has been obtained at the host.

Figure 7:
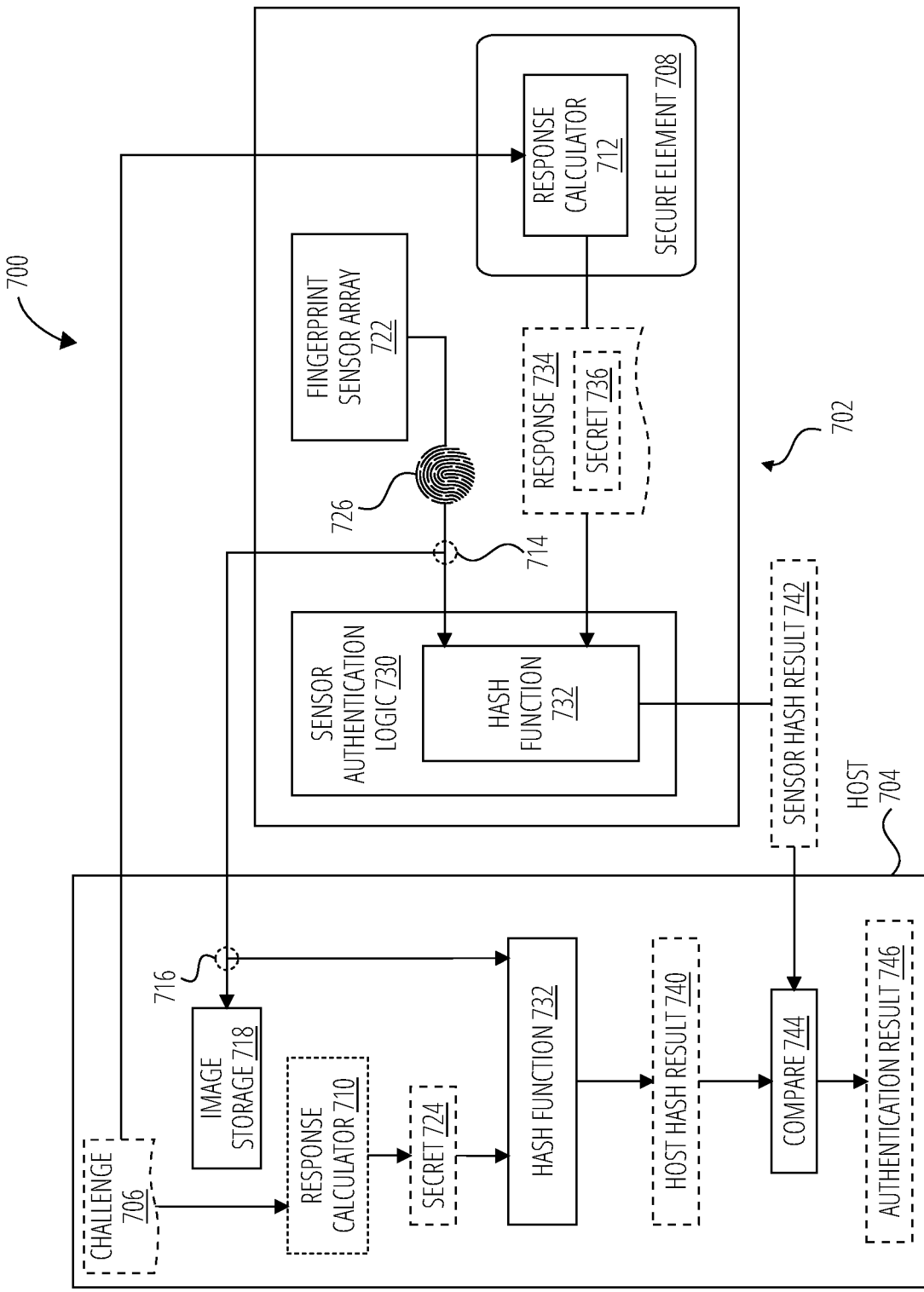
FIG. 7 depicts a second example information-flow diagram, showing an example arrangement in which an example host and an example biometric sensor both utilize a single parallel hash function, in accordance with at least one embodiment.

FIG. 7 depicts a second example information-flow diagram 700, showing an example arrangement in which an example host and an example biometric sensor both utilize a single parallel hash function, in accordance with at least one embodiment. FIG. 7 is quite similar to FIG. 6, simpler in fact, and is therefore not described here in as great of detail. The main difference between the information-flow diagram 600 of FIG. 6 and the information-flow diagram 700 of FIG. 7 is that involves only a single hash function on each side (the secure-biometric-sensor system 702 and the host 704), whereas the information-flow diagram 600 of FIG. 6 involved two (and more could be used).

The elements in FIG. 7 that are essentially the same (in at least one embodiment) as correspondingly numbered elements in FIG. 6 are the cryptographic challenge 706, the response calculator 710, the secret 724, the secure element 708, the response calculator 712, the cryptographic response 734 and the secret 736, 1 the image storage 718, the compare function 744, and the authentication result 746.

In the single hash function 732 on each side, the fingerprint image 726 and the secret 724 or 736 may be combined in a predetermined way prior to being processed through the hash function 732, thus producing a cryptographically entangled token using just a single hash function. As an example, both the host 704 and the secure-biometric-sensor system 702 could place their calculated secret in a particular position in the block sequence made up of the fingerprint image 726 and the secret 724 or 736. For example, both sides could place their secret fifth from last prior to generating the host hash result 740 and the sensor hash result 742, respectively, and know that the other will do the same. In another example, the selected position for the secret in the block sequence could be dependent on the calculated secret itself. For example, both sides could compute a value such as:

$$\text{block position (from last) secret} = \text{secret modulo } 11$$

where both sides would know that 11 was the modulus to use. In other embodiments, a last (or any other predetermined digit) of the calculated secret could be used as the modulus. And certainly innumerable other ways to combine the fingerprint image 726 and the secret 724 or 736 in a predetermined way could be utilized in the generation of a cryptographically entangled token. Similar to FIG. 6, the compare function 744 may result in an authentication result 746 set to true or false depending on whether a match was identified between the host hash result 740 and the sensor hash result 742.

Figure 8:
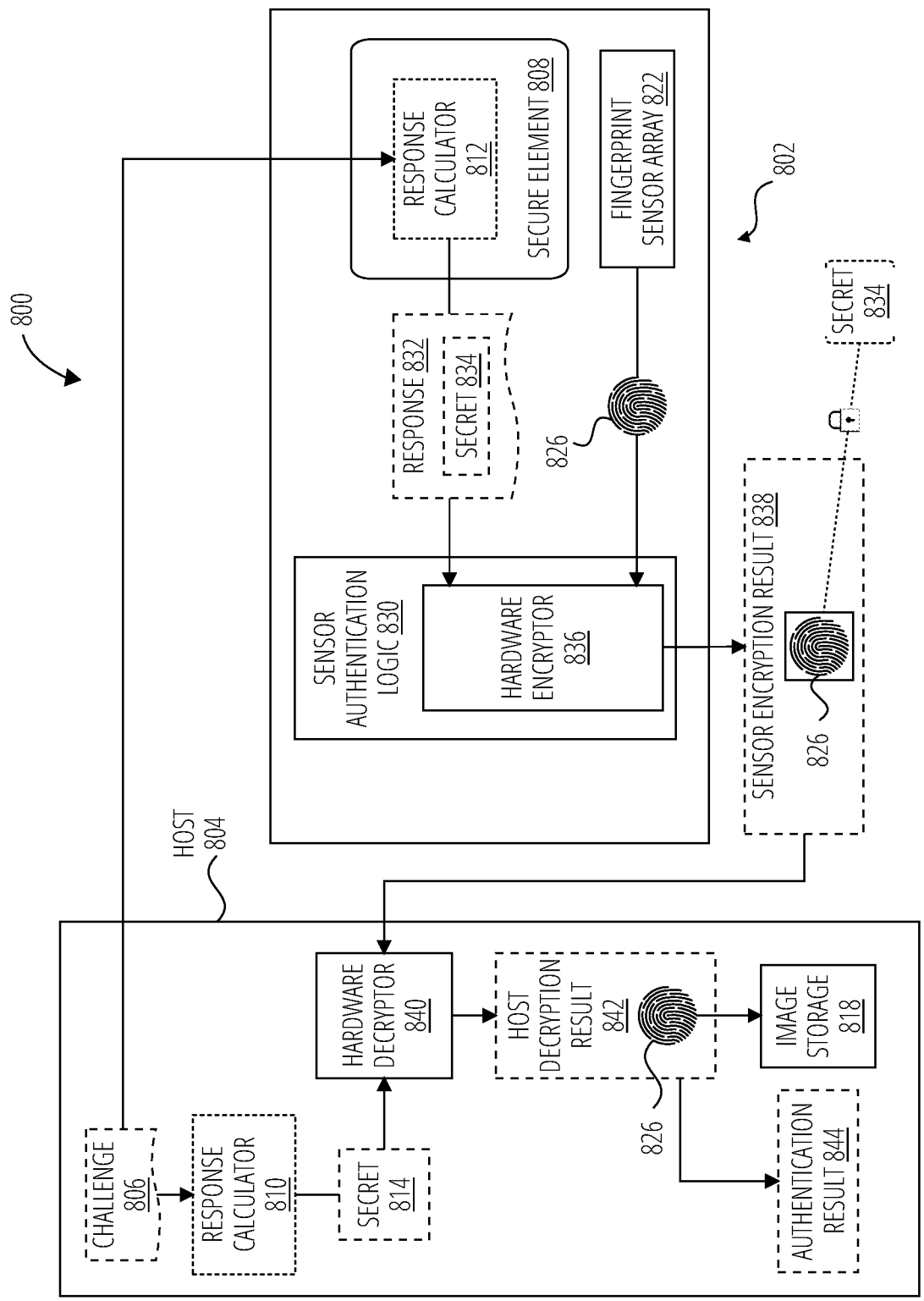
FIG. 8 depicts a third example information-flow diagram, showing a first example arrangement in which an example host and an example biometric sensor utilize a common encryption-and-decryption scheme, in accordance with at least one embodiment.

FIG. 8 depicts a third example information-flow diagram 800, showing a first example arrangement in which an example host 804 and an example secure-biometric-sensor system 802 utilize a common encryption-and-decryption scheme, in accordance with at least one embodiment. The encryption embodiments that are described in connection with FIG. 8, FIG. 9, and FIG. 10 may incur greater latency than the hash-function-based embodiments described above, in general because the secure element in the respective embodiments has to finish calculating the secret prior to the image data and the secret being used together to generate an encrypted cryptographically entangled token (which in these embodiments includes the entire image and additional data).

The elements in FIG. 8 that, in at least one embodiment, are essentially the same as correspondingly numbered elements in the earlier figures (and therefore are not described in as great of detail) are the cryptographic challenge 806, the response calculator 810, the secure element 808, the response calculator 812, the secret 814, the cryptographic response 832 including the secret 834, the image storage 818, the fingerprint sensor array 822, and the fingerprint image 826.

In this embodiment, the sensor authentication logic 830 includes a hardware encryptor 836, which uses a block-cipher-based encryption standard such as the Advanced Encryption Standard (AES) to encrypt blocks of data using an encryption key. In the embodiment that is shown in FIG. 8, the hardware encryptor 836 encrypts the fingerprint image 826 using the secret 834 as the encryption key, and the host 804 correspondingly uses its calculated secret 814 to decrypt the fingerprint image 826. The authentication result 844 may be set to true upon a successful decryption and to false otherwise. In at least some embodiments such as those depicted in FIG. 8, FIG. 9, and FIG. 10, the transmission of the fingerprint image does not occur until the encryption has been performed, regardless of the fact that, in some descriptions of embodiments, this operation is mentioned at an ostensibly earlier point in the process (e.g., at operation 1108 in the communication arrangement 100 of FIG. 11.

Figure 9:
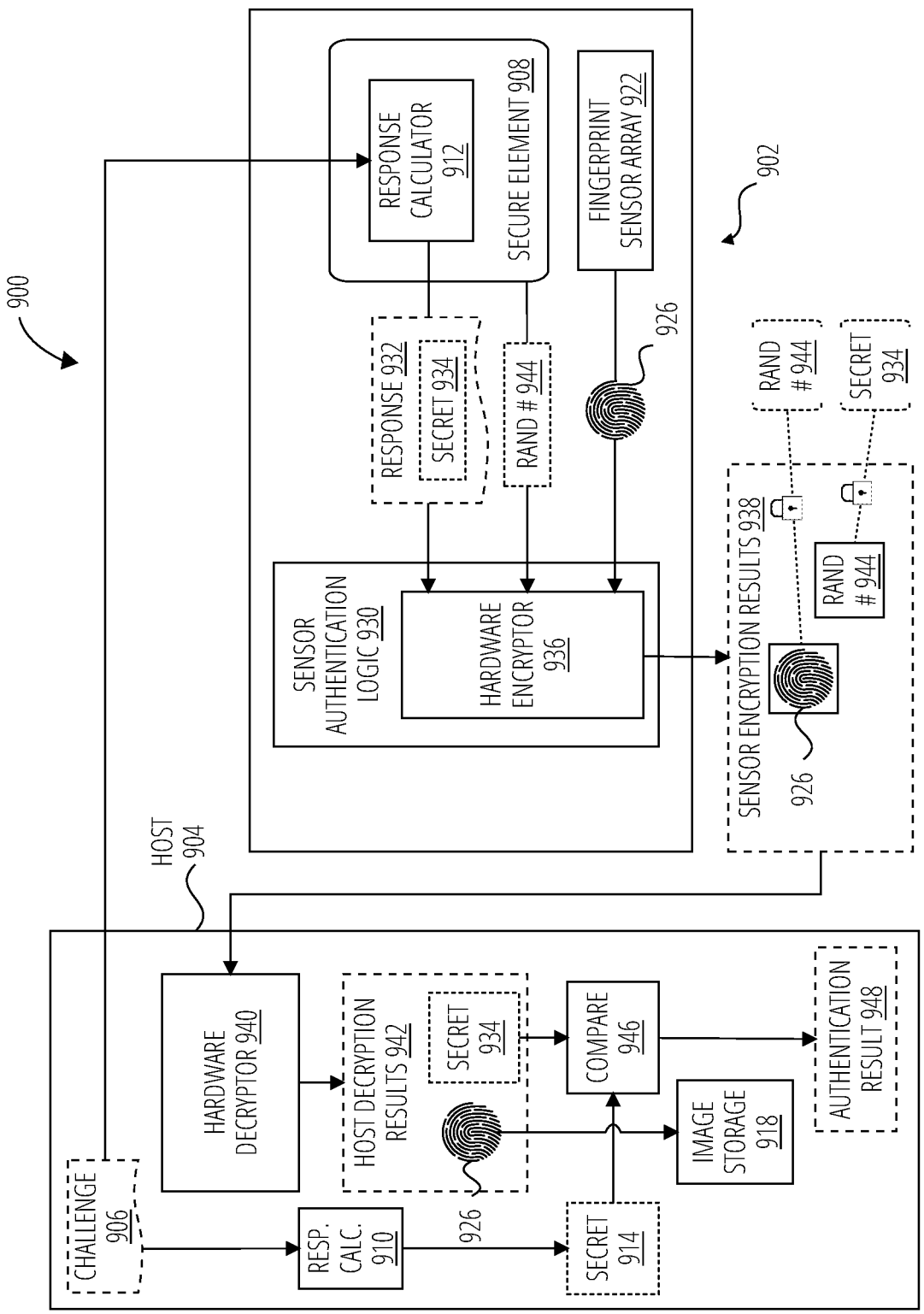
FIG. 9 depicts a fourth example information-flow diagram, showing a second example arrangement in which an example host and an example biometric sensor utilize a common encryption-and-decryption scheme, in accordance with at least one embodiment.

FIG. 9 depicts a fourth example information-flow diagram 900, showing a second example arrangement in which an example host and an example biometric sensor utilize a common encryption-and-decryption scheme, in accordance with at least one embodiment. The information-flow diagram 900 of FIG. 9 is somewhat similar to the information-flow diagram 800 of FIG. 8, and thus is not described herein in as great of detail. Once difference is that the hardware encryptor 936 encrypts the fingerprint image 926 with an encryption key that is equal to a random number 944 that the hardware encryptor 936 requests from the secure element 908. In other embodiments, the sensor authentication logic 930 itself may generate the random number 944.

Furthermore, as shown in the sensor encryption result 938, the hardware encryptor 936 not only encrypts the fingerprint image 926 using the random number 944 as the (ephemeral) encryption key, but also encrypts the random number using the secret 934 as the encryption key for that encryption. In an embodiment, the host 904 requests the encrypted random number 944 after first receiving the encrypted fingerprint image 926. The host 904 may then use its own calculated secret 914 to decrypt the random number 944, and then proceed to use the random number 944 as an ephemeral session key to decrypt the fingerprint image 926. The result of the compare function 946 may be stored as the authentication result 948.

Figure 10:
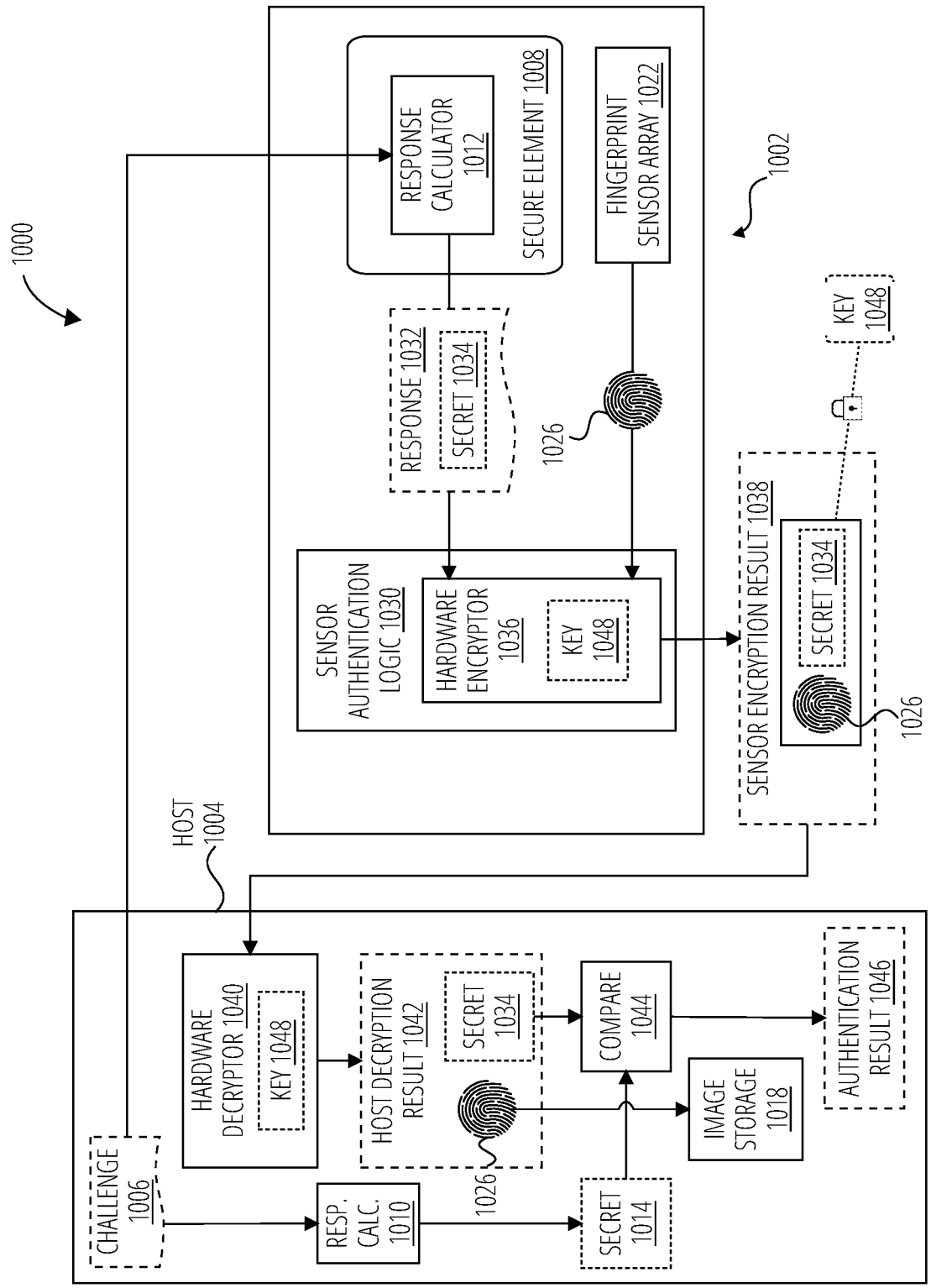
FIG. 10 depicts a fifth example information-flow diagram, showing a third example arrangement in which an example host and an example biometric sensor utilize a common encryption-and-decryption scheme, in accordance with at least one embodiment.

FIG. 10 depicts a fifth example information-flow diagram 1000, showing a third example arrangement in which an example host 1004 and an example secure-biometric-sensor system 1002 utilize a common encryption-and-decryption scheme, in accordance with at least one embodiment. The elements in FIG. 10 that are essentially the same as their similarly numbered counterparts in earlier figures are the cryptographic challenge 1006, the secure element 1008, the response calculator 1010, the response calculator 1012, the secret 1014, the image storage 1018, the fingerprint sensor array 1022, the fingerprint image 1026, and the compare function 1044.

The major difference in FIG. 10 as compared with the previous two figures is that, as can be seen in the sensor encryption result 1038, the sensor authentication logic 1030 utilizes the hardware encryptor 1036 to encrypt both the fingerprint image 1026 and the secret 1034 together as a package, using a symmetric encryption key 1048 for the encryption. Similarly on the host side, the key 1048 is used to decrypt the information sent from the secure-biometric-sensor system 802, and then the host 1004 uses a compare function 1044 to compare the host-calculated secret 1014 with the secure-element calculated secret 1034. A true or false result can be stored as the authentication result 1046 depending on the output of the compare function 1044. Moreover, the fingerprint image 1026 can be stored in an image storage 1018.

Figure 11:
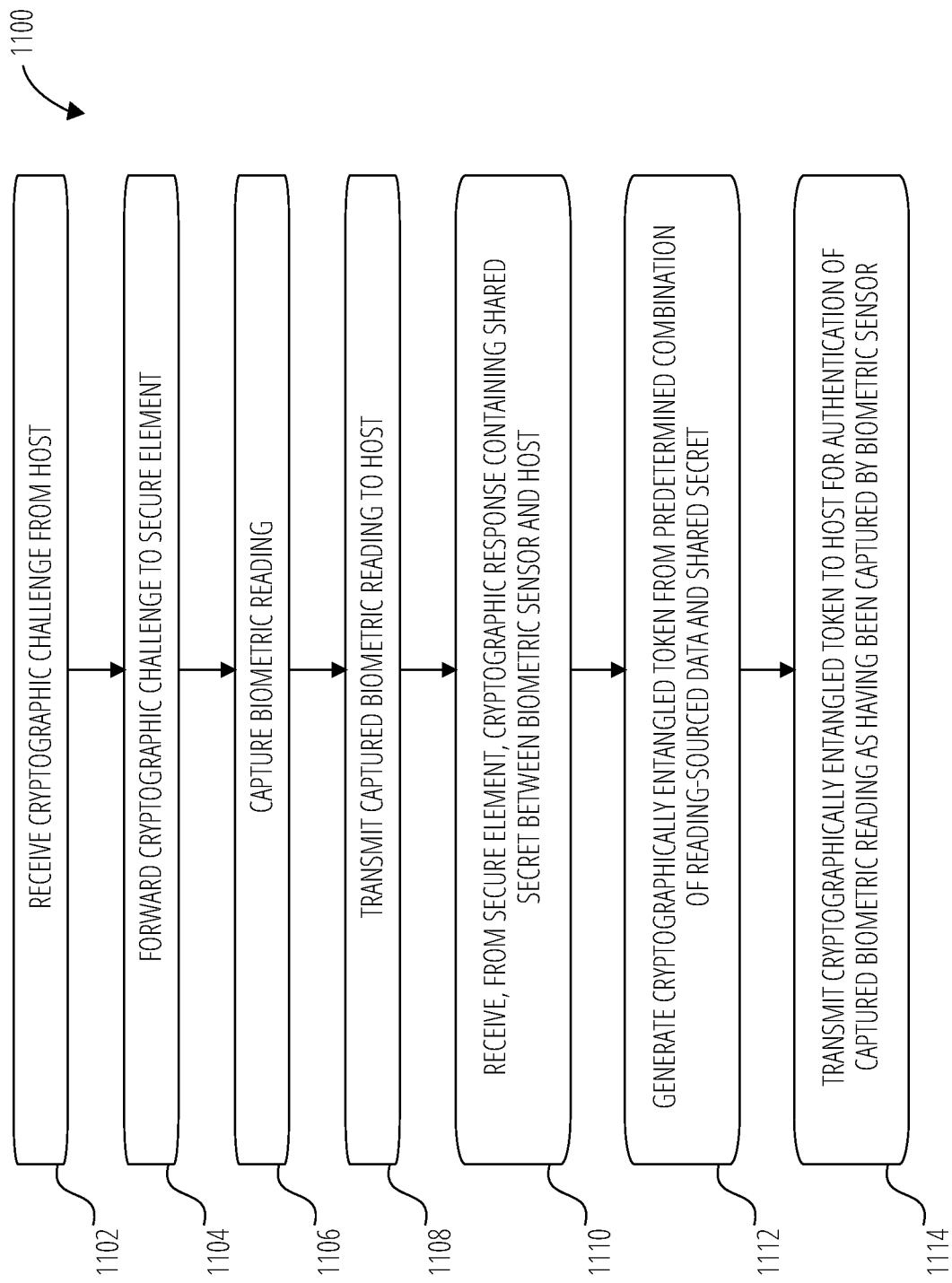
FIG. 11 depicts an example method that may be performed by, as examples, a biometric sensor or a secure-biometric-sensor system, in accordance with at least one embodiment.

FIG. 11 depicts a method 1100 that is described here by way of example as being performed by a secure-biometric-sensor system such as the secure-biometric-sensor system 102, the secure-biometric-sensor system 202, the secure-biometric-sensor system 302, the secure-biometric-sensor system 402, or another secure-biometric-sensor system. In general, the method 1100 can be performed by any suitable computing and communication device that is equipped, programmed, and configured to perform the recited functions. While the description here of the method 1100 is relatively brief, it should be understood that every permutation and combination of every embodiment that is disclosed herein can be applied as a permutation, embodiment, or the like of the method 1100.

At operation 1102, a secure-biometric-sensor system receives a cryptographic challenge from a host. The biometric sensor is communicatively interposed between the host and a secure element, and the biometric sensor and the secure element are physically bound to one another. At operation 1104, the secure-biometric-sensor system forwards the cryptographic challenge to the secure element. At operation 1106, the secure-biometric-sensor system captures a biometric reading using a biometric-sensing element. At operation 1108, the secure-biometric-sensor system transmits the captured biometric reading to the host. It is noted that, as described above, this operation may not be carried out until an encryption has been performed on the sensor side. As a general matter, unless dictated by logical dependency, the order of operations in which the operations of the method 1100 are listed is not meant as a limitation, and certainly the operations can be performed in different orders.

At operation 1110, the secure-biometric-sensor system receives a cryptographic response from the secure element, the cryptographic response having been calculated by the secure element based on the cryptographic challenge, the cryptographic response including a shared secret between the host and the secure element. At operation 1112, the secure-biometric-sensor system generates a cryptographically entangled token (e.g., a result of one or more hash functions, an encryption results, etc.) from a predetermined combination of reading-specific data and the shared secret, the reading-specific data including one or both of the biometric reading (e.g., a fingerprint image) and data derived from the biometric reading (e.g., a hash of a fingerprint image perhaps together with one or more other values such as a calculated cryptographic-response secret). At operation 1114, the secure-biometric-sensor system transmits the cryptographically entangled token to the host for use by the host in attempting to authenticate the captured biometric reading as having been captured by the biometric sensor.

Figure 12:
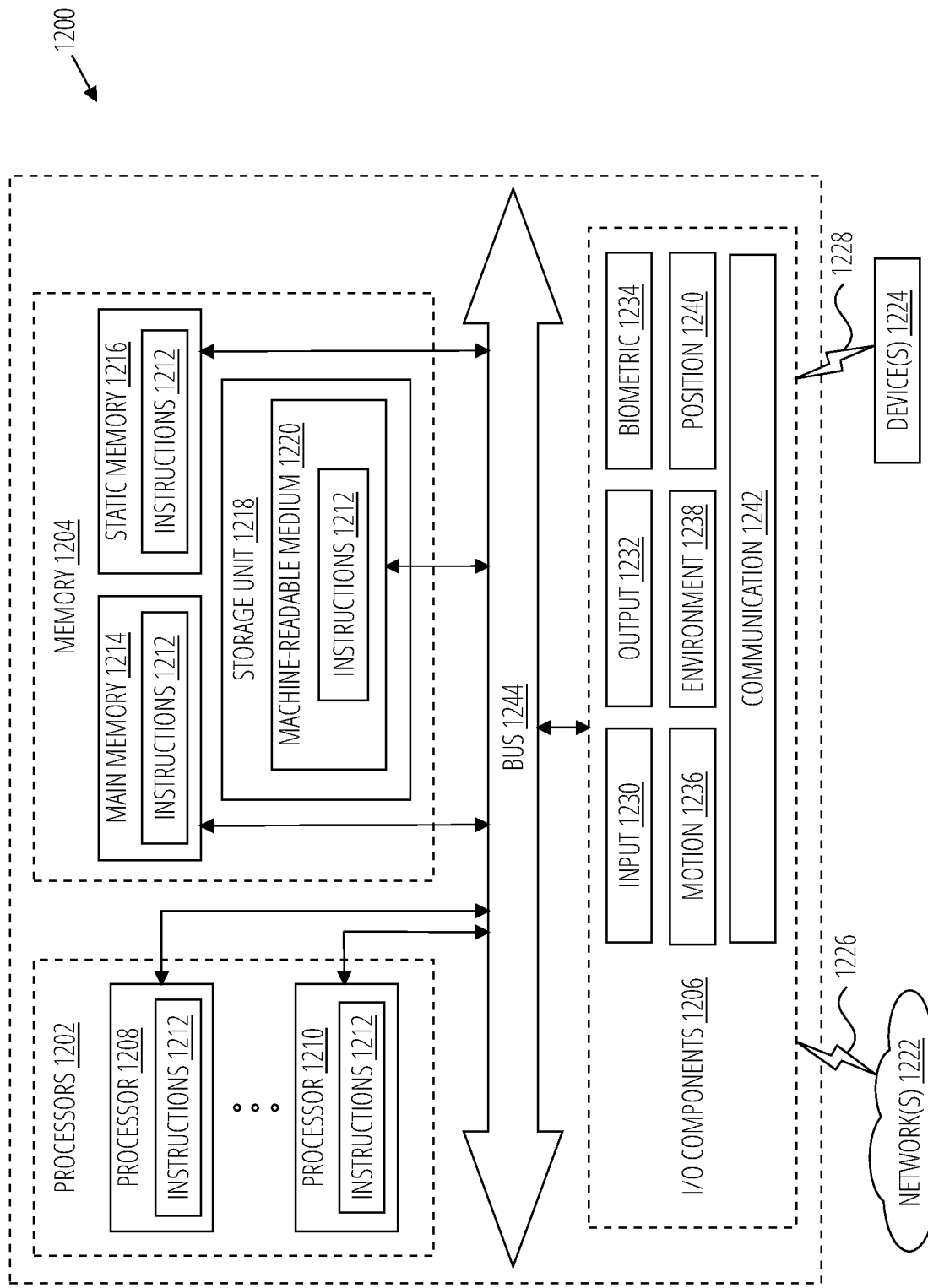
FIG. 12 depicts an example computer system that could be configured to perform at least one embodiment and/or embody one or more devices, systems, and/or the like in accordance with at least one embodiment.

FIG. 12 depicts an example computer system 1200 that could be utilized to embody and/or perform at least one embodiment, and within which instructions 1212 (e.g., software, a program, an application, an applet, an app, and/or other executable code) may be executed to cause the computer system 1200 to perform any one or more of the methodologies discussed herein. For example, execution of the instructions 1212 may cause the computer system 1200 to perform any one or more of the methods described herein. The instructions 1212 transform the general, non-programmed computer system 1200 into a particular computer system 1200 programmed to carry out the described and illustrated functions in the manner described. The computer system 1200 may operate as a standalone device or may be coupled (e.g., networked) to other machines. In a networked deployment, the computer system 1200 may operate in the capacity of a server machine or a client machine in a server-client network environment, or as a peer machine in a peer-to-peer (or distributed) network environment.

With respect to the present disclosure, it is noted that, on the sensor side, the herein-described sensor authentication logic in any give embodiment could be implemented in hardware (e.g., dedicated hardware) or via a processor executing instructions, among other options. Similarly on the host side, either of those options and/or another option could be implemented.

The computer system 1200 may be or include, but is limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, and/or any other machine capable of executing the instructions 1212, sequentially or otherwise, that specify actions to be taken by the computer system 1200. Further, while only a single computer system 1200 is illustrated, the term "machine" shall also be taken to include a collection of machines that individually or jointly execute the instructions 1212 to perform any one or more of the methodologies discussed herein.

The computer system 1200 may include processors 1202, memory 1204, and I/O components 1206, which may be configured to communicate with each other via a bus 1244. In an example embodiment, the processors 1202 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, for example, a processor 1208 and a processor 1210 that execute the instructions 1212. The term "processor" is intended to include multi-core processors that may include two or more independent processors (sometimes referred to as "cores") that may execute instructions contemporaneously. Although FIG. 12 shows multiple processors 1202, the computer system 1200 may include a single processor with a single core, a single processor with multiple cores (e.g., a multi-core processor), multiple processors with a single core, multiple processors with multiples cores, or any combination thereof.

The memory 1204 includes a main memory 1214, a static memory 1216, and a storage unit 1218, each of which is accessible to the processors 1202 via the bus 1244. The memory 1204, the static memory 1216, and/or the storage unit 1218 may store the instructions 1212 executable for performing any one or more of the methodologies or functions described herein. The instructions 1212 may also or instead reside completely or partially within the main memory 1214, within the static memory 1216, within machine-readable medium 1220 within the storage unit 1218, within at least one of the processors 1202 (e.g., within a cache memory of a given one of the processors 1202), and/or any suitable combination thereof, during execution thereof by the computer system 1200. The machine-readable medium 1220 is one or more non-transitory computer-readable storage media.

The I/O components 1206 may include a wide variety of components to receive input, produce and/or provide output, transmit information, exchange information, capture measurements, and/or the like. The specific I/O components 1206 that are included in a particular instance of the computer system 1200 will depend on the type of machine. For example, portable machines such as mobile phones may include a touch input device or other such input mechanisms, while a headless server machine may not include such a touch input device. It will be appreciated that the I/O components 1206 may include many other components that are not shown in FIG. 12.

In various example embodiments, the I/O components 1206 may include output components 1232 and input components 1230. The output components 1232 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touchscreen configured to receive alphanumeric input, a photo-optical keyboard, and/or other alphanumeric input components), point-based input components (e.g., a mouse, a touchpad, a trackball, a joystick, a motion sensor, and/or one or more other pointing instruments), tactile input components (e.g., a physical button, a touchscreen that is responsive to location and/or force of touches or touch gestures, and/or one or more other tactile input components), audio input components (e.g., a microphone), and/or the like.

In further example embodiments, the I/O components 1206 may include biometric components 1234, motion components 1236, environmental components 1238, and/or position components 1240, among a wide array of other components. The biometric components 1234 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, and/or electroencephalogram-based identification), and/or the like. The motion components 1236 may include acceleration-sensing components (e.g., an accelerometer), gravitation-sensing components, rotation-sensing components (e.g., a gyroscope), etc.

The environmental components 1238 may include, for example, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors that detect nearby objects), gas-sensing components (e.g., gas-detection sensors to detection concentrations of hazardous gases for safety and/or to measure pollutants in the atmosphere), and/or other components that may provide indications, measurements, signals, and/or the like that correspond to a surrounding physical environment. The position components 1240 may include location-sensing components (e.g., a global positioning system (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 1206 may further include communication components 1242 operable to communicatively couple the computer system 1200 to a network 1222 and/or devices 1224 via a coupling 1226 and/or a coupling 1228, respectively. For example, the communication components 1242 may include a network-interface component or another suitable device to interface with the network 1222. In further examples, the communication components 1242 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 1224 may include one or more other machines and/or any of a wide variety of peripheral devices (e.g., a peripheral device coupled via a universal serial bus (USB) connection).

Moreover, the communication components 1242 may detect identifiers or include components operable to detect identifiers. For example, the communication components 1242 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 1242, such as location via Internet Protocol (IP) geolocation, location via Wi-Fi signal triangulation, location via detecting an NFC beacon signal that may indicate a particular location, and/or the like.

One or more of the various memories (e.g., the memory 1204, the main memory 1214, the static memory 1216, and/or the (e.g., cache) memory of one or more of the processors 1202) and/or the storage unit 1218 may store one or more sets of instructions (e.g., software) and/or data structures embodying or used by any one or more of the methodologies or functions described herein. These instructions (e.g., the instructions 1212), when executed by one or more of the processors 1202, cause various operations to implement various embodiments of the present disclosure.

The instructions 1212 may be transmitted or received over the network 1222, using a transmission medium, via a network-interface device (e.g., a network-interface component included in the communication components 1242) and using any one of a number of well-known transfer protocols (e.g., the Session Initiation Protocol (SIP), the hypertext transfer protocol (HTTP), and/or the like). Similarly, the instructions 1212 may be transmitted or received using a transmission medium via the coupling 1228 (e.g., a peer-to-peer coupling) to the devices 1224.

Figure 13:
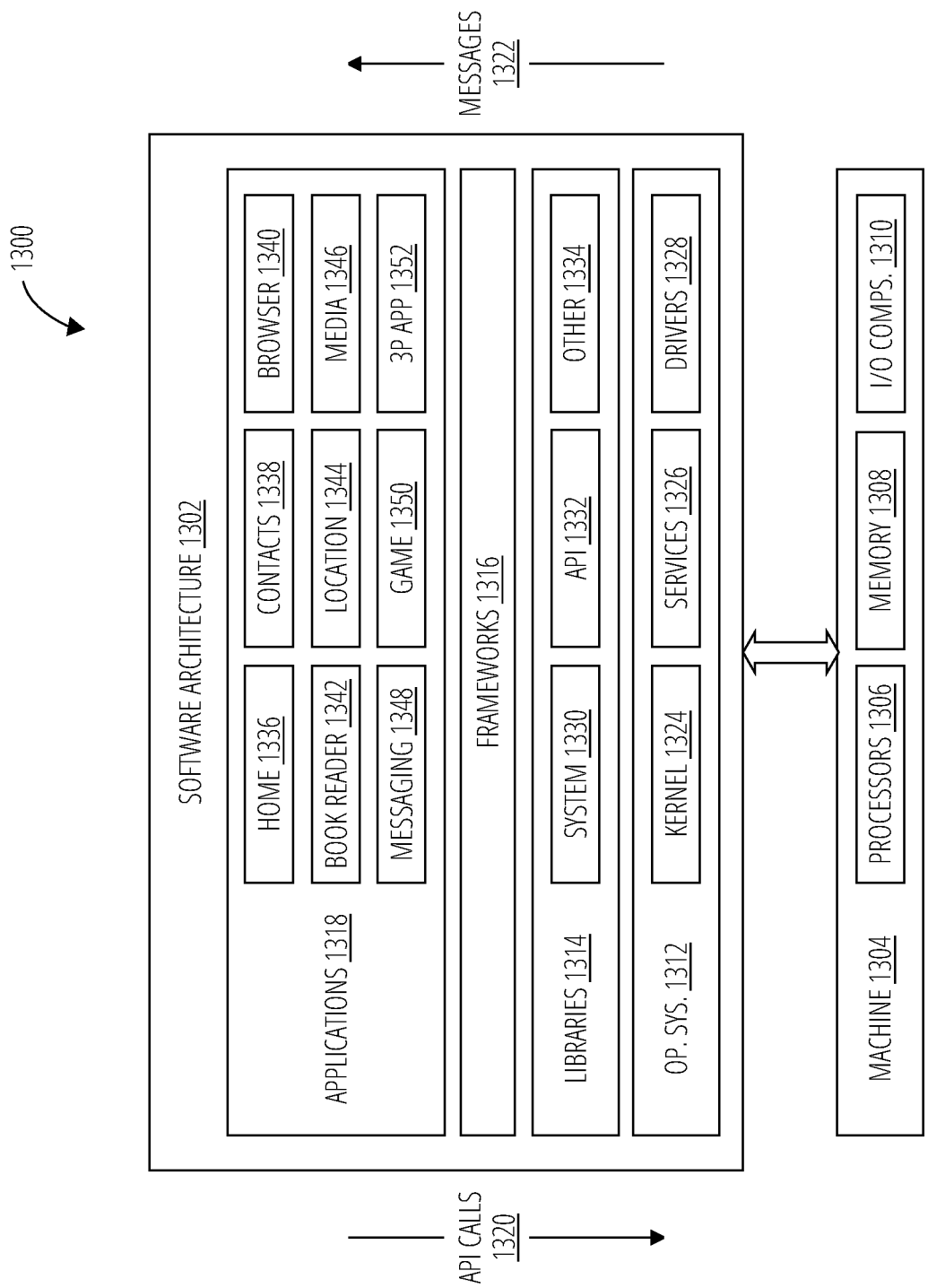
FIG. 13 depicts an example software architecture that could be implemented on a computer system such as the example computer system of FIG. 12, in accordance with at least one embodiment.

FIG. 13 depicts an example software architecture 1302 that could be executed on the example computer system 1200 of FIG. 12, in accordance with at least one embodiment. The illustrated example software architecture 1302 can be installed on any one or more of the devices described herein. For example, the software architecture 1302 could be installed on any device or system that is arranged similar to the computer system 1200 of FIG. 12. The software architecture 1302 is supported by hardware such as a machine 1304 that includes processors 1306, memory 1308, and I/O components 1310. In this example, the software architecture 1302 can be conceptualized as a stack of layers, where each layer provides a particular functionality. The software architecture 1302 includes layers such an operating system 1312, libraries 1314, frameworks 1316, and applications 1318. Operationally, using one or more application programming interfaces (APIs), the applications 1318 invoke API calls 1320 through the software stack and receive messages 1322 in response to the API calls 1320.

The operating system 1312 manages hardware resources and provides common services. The operating system 1312 includes, for example, a kernel 1324, services 1326, and drivers 1328. The kernel 1324 acts as an abstraction layer between the hardware and the other software layers. For example, the kernel 1324 may provide memory management, processor management (e.g., scheduling), component management, networking, and/or security settings, in some cases among other functionality. The services 1326 can provide other common services for the other software layers. The drivers 1328 are responsible for controlling or interfacing with the underlying hardware. For instance, the drivers 1328 can include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 1314 provide a low-level common infrastructure used by the applications 1318. The libraries 1314 can include system libraries 1330 (e.g., a C standard library) that provide functions such as memory-allocation functions, string-manipulation functions, mathematic functions, and/or the like. In addition, the libraries 1314 can include API libraries 1332 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in graphic content on a display), database libraries (e.g., SQLite to provide various relational-database functions), web libraries (e.g., WebKit to provide web-browsing functionality), and/or the like. The libraries 1314 can also include a wide variety of other libraries 1334 to provide many other APIs to the applications 1318.

The frameworks 1316 may provide a high-level common infrastructure that is used by the applications 1318. For example, the frameworks 1316 may provide various graphical user interface (GUI) functions, high-level resource management, high-level location services, and/or the like. The frameworks 1316 can provide a broad spectrum of other APIs that can be used by the applications 1318, some of which may be specific to a particular operating system or platform.

Purely as representative examples, the applications 1318 may include a home application 1336, a contacts application 1338, a browser application 1340, a book-reader application 1342, a location application 1344, a media application 1346, a messaging application 1348, a game application 1350, and/or a broad assortment of other applications generically represented in FIG. 13 as a third-party application 1352. The applications 1318 are programs that execute functions defined in the programs. Various programming languages can be employed to create one or more of the applications 1318, structured in a variety of manners, such as object-oriented programming languages (e.g., Objective-C, Java, C++, etc.), procedural programming languages (e.g., C, assembly language, etc.), and/or the like. In a specific example, the third-party application 1352 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. In this example, the third-party application 1352 can invoke the API calls 1320 provided by the operating system 1312 to facilitate functionality described herein.

In view of the disclosure above, various examples are set forth below. It should be noted that one or more features of an example, taken in isolation or combination, should be considered within the disclosure of this application.

Example 1 is a secure-biometric-sensor system including: a secure element; and a biometric sensor that is configured to be communicatively interposed between a host and the secure element, the biometric sensor and the secure element being physically bound to one another, the biometric sensor including sensor authentication logic that, when executed by at least one hardware processor of the biometric sensor, causes the biometric sensor to perform operations including: receiving a cryptographic challenge from the host; forwarding the cryptographic challenge to the secure element; capturing a biometric reading using a biometric-sensing element; transmitting the captured biometric reading to the host; receiving a cryptographic response from the secure element, the cryptographic response having been calculated by the secure element based on the cryptographic challenge, the cryptographic response including a shared secret between the host and the secure element; generating a cryptographically entangled token from a predetermined combination of reading-specific data and the shared secret, the reading-specific data including one or both of the biometric reading and data derived from the biometric reading; and transmitting the cryptographically entangled token to the host for use by the host in attempting to authenticate the captured biometric reading as having been captured by the biometric sensor.

Example 2 is the secure-biometric-sensor system of Example 1, where the biometric sensor and the secure element being physically bound to one another includes the biometric sensor and the secure element being affixed to a common package substrate.

Example 3 is the secure-biometric-sensor system of either Example 1 or Example 2, where: the biometric sensor being configured to be communicatively interposed between the host and the secure element includes the biometric sensor including: a first communication interface via which the biometric sensor is configured to communicate with the host; and a second communication interface, distinct from the first, via which the biometric sensor is configured to separately communicate with the secure element.

Example 4 is the secure-biometric-sensor system of any of the Examples 1-3, where the transmitting of the captured biometric reading to the host begins prior to the receiving of the cryptographic response from the secure element.

Example 5 is the secure-biometric-sensor system of any of the Examples 1-3, where: the transmitting of the captured biometric reading to the host begins after the receiving of the cryptographic response from the secure element; and the operations further include using the shared secret to encrypt the captured biometric reading prior to transmitting the captured biometric reading to the host.

Example 6 is the secure-biometric-sensor system of any of the Examples 1-5, the operations further including, prior to the transmitting of the cryptographically entangled token to the host, using the secure element to digitally sign the cryptographically entangled token for verification by the host of a digital certificate of the secure element.

Example 7 is the secure-biometric-sensor system of any of the Examples 1-6, where: the cryptographically entangled token includes a sensor-side hash result of a hash function; and the operations further include using the hash function to generate the sensor-side hash result from the predetermined combination of the reading-specific data and the shared secret.

Example 8 is the secure-biometric-sensor system of Example 7, where the host attempting to authenticate the captured biometric reading as having been captured by the biometric sensor includes the host: calculating a host-side copy of the shared secret from the cryptographic challenge; using the hash function to generate a host-side hash result from a parallel predetermined combination of host-side reading-specific data and the host-side copy of the shared secret; and determining whether the sensor-side hash result matches the host-side hash result.

Example 9 is the secure-biometric-sensor system of any of the Examples 1-6, where the cryptographically entangled token includes a sensor-side hash result of an outer hash function; and the operations further include: using an inner hash function to generate an intermediate sensor-side hash result from the biometric reading and the shared secret; and using the outer hash function to generate the sensor-side hash result from the intermediate sensor-side hash result.

Example 10 is the secure-biometric-sensor system of Example 9, where using the inner hash function to generate the intermediate sensor-side hash result from the biometric reading and the shared secret includes: using the inner hash function to generate a first of two portions of the intermediate sensor-side hash result from the biometric reading and the shared secret; and subsequently using the inner hash function to generate a second of the two portions of the intermediate sensor-side hash result.

Example 11 is the secure-biometric-sensor system of Example 10, where at least some of the using of the inner hash function to generate the first of the two portions of the intermediate sensor-side hash result occurs prior to receiving the cryptographic response from the secure element.

Example 12 is the secure-biometric-sensor system of Example 10, where all of the using of the inner hash function to generate the first of the two portions of the intermediate sensor-side hash result occurs prior to receiving the cryptographic response from the secure element.

Example 13 is the secure-biometric-sensor system of any of the Examples 9-12, where the host attempting to authenticate the captured biometric reading as having been captured by the biometric sensor includes the host: calculating a host-side copy of the shared secret from the cryptographic challenge; using the inner hash function to generate an intermediate host-side hash result from the biometric reading and the host-side copy of the shared secret; using the outer hash function to generate a host-side hash result from the intermediate host-side hash result; and determining whether the sensor-side hash result matches the host-side hash result.

Example 14 is the secure-biometric-sensor system of any of the Examples 1-6, further including using a block cipher to encrypt the biometric reading using a first encryption key prior to the transmitting of the captured biometric reading to the host, where: the cryptographically entangled token includes the encrypted biometric reading; and the transmitting of the cryptographically entangled token to the host includes the transmitting of the captured biometric reading to the host.

Example 15 is the secure-biometric-sensor system of Example 14, where the shared secret is the first encryption key.

Example 16 is the secure-biometric-sensor system of Example 15, where the host attempting to authenticate the captured biometric reading as having been captured by the biometric sensor includes the host: calculating a host-side copy of the shared secret from the cryptographic challenge; and using the host-side copy of the shared secret as a decryption key to decrypt the encrypted biometric reading.

Example 17 is the secure-biometric-sensor system of Example 14, further including: obtaining a random number, where the obtained random number is the first encryption key; generating an encrypted random number by encrypting the random number using the shared secret as a second encryption key; and transmitting the encrypted random number to the host.

Example 18 is the secure-biometric-sensor system of Example 17, where the host attempting to authenticate the captured biometric reading as having been captured by the biometric sensor includes the host: calculating a host-side copy of the shared secret from the cryptographic challenge; obtaining the random number by using the host-side copy of the shared secret as a second decryption key to decrypt the encrypted random number; and using the obtained random number as a first decryption key to decrypt the encrypted biometric reading.

Example 19 is the secure-biometric-sensor system of any of the Examples 1-18, wherein the captured biometric reading comprises liveliness data.

Example 20 is a biometric sensor including: first and second communication interfaces via which the biometric sensor is configured to be communicatively interposed between a host and a secure element, the biometric sensor and the secure element being physically bound to one another; and sensor authentication logic that, when executed by at least one hardware processor of the biometric sensor, causes the biometric sensor to perform operations including: receiving a cryptographic challenge from the host; forwarding the cryptographic challenge to the secure element; capturing a biometric reading using a biometric-sensing element; transmitting the captured biometric reading to the host; receiving a cryptographic response from the secure element, the cryptographic response having been calculated by the secure element based on the cryptographic challenge, the cryptographic response including a shared secret between the host and the secure element; generating a cryptographically entangled token from a predetermined combination of reading-specific data and the shared secret, the reading-specific data including one or both of the biometric reading and data derived from the biometric reading; and transmitting the cryptographically entangled token to the host for use by the host in attempting to authenticate the captured biometric reading as having been captured by the biometric sensor.

Example 21 is a method performed by a biometric sensor executing stored instructions, the method including: receiving a cryptographic challenge from a host, the biometric sensor being communicatively interposed between the host and a secure element, the biometric sensor and the secure element being physically bound to one another; forwarding the cryptographic challenge to the secure element; capturing a biometric reading using a biometric-sensing element; transmitting the captured biometric reading to the host; receiving a cryptographic response from the secure element, the cryptographic response having been calculated by the secure element based on the cryptographic challenge, the cryptographic response including a shared secret between the host and the secure element; generating a cryptographically entangled token from a predetermined combination of reading-specific data and the shared secret, the reading-specific data including one or both of the biometric reading and data derived from the biometric reading; and transmitting the cryptographically entangled token to the host for use by the host in attempting to authenticate the captured biometric reading as having been captured by the biometric sensor.

Example 22 is one more non-transitory computer-readable storage media containing instructions that, when executed by at least one hardware processor, cause the at least one hardware processor to perform operations including the operations recited above in connection with Example 1.

Example 23 is one more non-transitory computer-readable storage media containing instructions that, when executed by at least one hardware processor, cause the at least one hardware processor to perform operations including the operations recited above in connection with Example 20.

Example 24 is one more non-transitory computer-readable storage media containing instructions that, when executed by at least one hardware processor, cause the at least one hardware processor to perform operations including the operations recited above in connection with Example 21.

Example 25 is a system that includes: at least one hardware processor; and one or more non-transitory computer-readable storage media containing instructions that, when executed by the at least one hardware processor, cause the at least one hardware processor to perform operations including the operations recited above in connection with Example 20.

Example 26 is a system that includes: at least one hardware processor; and one or more non-transitory computer-readable storage media containing instructions that, when executed by the at least one hardware processor, cause the at least one hardware processor to perform operations including the operations recited above in connection with Example 21.

Further examples include secure-biometric-sensor system embodiments, biometric-sensor embodiments, method embodiments, non-transitory-computer-readable-storage-media embodiments, and system embodiments of the above-described Examples 2-19.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

Any component of a device, system, and/or the like that is referred to in the present disclosure as a module includes both hardware and executable instructions, and could be realized in or as a single component or could be distributed across multiple components. When executed by the hardware, the instructions cause the hardware to perform (e.g., execute, carry out, and the like) the one or more operations (e.g., functions) that are described herein as being performed by the module. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more hardware devices and/or hardware components of any other type deemed suitable by those of skill in the art for a given implementation. The instructions could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. $E^2$PROM), flash memory, and/or one or more other types of memory) and/or one or more other types of non-transitory computer-readable storage medium.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Additionally, as used in this disclosure, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, in this disclosure, this manner of phrasing does not mean "at least one of A and at least one of B," "at least one of A, at least one of B, and at least one of C," and so on. As used in this disclosure, the two-element version covers each of the following: one or more of A and no B, one or more of B and no A, and one or more of A and one or more of B. And similarly for the three-element version and beyond. Similar construction should be given to such phrases in which "one or more" is used in place of "at least one," again unless explicitly stated otherwise in connection with a particular instance.

Moreover, consistent with the fact that the entities and arrangements that are described herein, including the entities and arrangements that are depicted in and described in connection with the drawings, are presented as examples and not by way of limitation, any and all statements or other indications as to what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively self-qualified by such a clause. It is for reasons akin to brevity and clarity of presentation that this implied self-qualifying clause is not repeated ad nauseum in this disclosure.

What is claimed is:

1. A secure-biometric-sensor system comprising:
    a secure element; and
    a biometric sensor that is configured to be communicatively interposed between a host and the secure element, the biometric sensor and the secure element being physically bound to one another, the biometric sensor comprising sensor authentication logic that, when executed by at least one hardware processor of the biometric sensor, causes the biometric sensor to perform operations comprising:
        receiving a cryptographic challenge from the host;
        forwarding the cryptographic challenge to the secure element;
        capturing a biometric reading using a biometric-sensing element;
        transmitting the captured biometric reading to the host;
        receiving a cryptographic response from the secure element, the cryptographic response having been calculated by the secure element based on the cryptographic challenge, the cryptographic response comprising a shared secret between the host and the secure element;
        generating a cryptographically entangled token from a predetermined combination of reading-specific data and the shared secret, the reading-specific data comprising one or both of the biometric reading and data derived from the biometric reading; and
        transmitting the cryptographically entangled token to the host for use by the host in attempting to authenticate the captured biometric reading as having been captured by the biometric sensor.

2. The secure-biometric-sensor system of claim 1, wherein the biometric sensor and the secure element being physically bound to one another comprises the biometric sensor and the secure element being affixed to a common package substrate.

3. The secure-biometric-sensor system of claim 1, wherein the biometric sensor being configured to be communicatively interposed between the host and the secure element comprises the biometric sensor comprising:
    a first communication interface via which the biometric sensor is configured to communicate with the host; and
    a second communication interface, distinct from the first, via which the biometric sensor is configured to separately communicate with the secure element.

4. The secure-biometric-sensor system of claim 1, wherein the transmitting of the captured biometric reading to the host begins prior to the receiving of the cryptographic response from the secure element.

5. The secure-biometric-sensor system of claim 1, wherein:
    the transmitting of the captured biometric reading to the host begins after the receiving of the cryptographic response from the secure element; and
    the operations further comprise using the shared secret to encrypt the captured biometric reading prior to transmitting the captured biometric reading to the host.

6. The secure-biometric-sensor system of claim 1, the operations further comprising, prior to the transmitting of the cryptographically entangled token to the host, using the secure element to digitally sign the cryptographically entangled token for verification by the host of a digital certificate of the secure element.

7. The secure-biometric-sensor system of claim 1, wherein:
    the cryptographically entangled token comprises a sensor-side hash result of a hash function; and
    the operations further comprise using the hash function to generate the sensor-side hash result from the predetermined combination of the reading-specific data and the shared secret.

8. The secure-biometric-sensor system of claim 7, wherein the host attempting to authenticate the captured biometric reading as having been captured by the biometric sensor comprises the host:
    calculating a host-side copy of the shared secret from the cryptographic challenge;
    using the hash function to generate a host-side hash result from a parallel predetermined combination of host-side reading-specific data and the host-side copy of the shared secret; and
    determining whether the sensor-side hash result matches the host-side hash result.

9. The secure-biometric-sensor system of claim 1, wherein:
    the cryptographically entangled token comprises a sensor-side hash result of an outer hash function; and
    the operations further comprise:
        using an inner hash function to generate an intermediate sensor-side hash result from the biometric reading and the shared secret; and
        using the outer hash function to generate the sensor-side hash result from the intermediate sensor-side hash result.

10. The secure-biometric-sensor system of claim 9, wherein using the inner hash function to generate the intermediate sensor-side hash result from the biometric reading and the shared secret comprises:
- using the inner hash function to generate a first of two portions of the intermediate sensor-side hash result from the biometric reading and the shared secret; and
- subsequently using the inner hash function to generate a second of the two portions of the intermediate sensor-side hash result.

11. The secure-biometric-sensor system of claim 10, wherein at least some of the using of the inner hash function to generate the first of the two portions of the intermediate sensor-side hash result occurs prior to receiving the cryptographic response from the secure element.

12. The secure-biometric-sensor system of claim 10, wherein all of the using of the inner hash function to generate the first of the two portions of the intermediate sensor-side hash result occurs prior to receiving the cryptographic response from the secure element.

13. The secure-biometric-sensor system of claim 9, wherein the host attempting to authenticate the captured biometric reading as having been captured by the biometric sensor comprises the host:
- calculating a host-side copy of the shared secret from the cryptographic challenge;
- using the inner hash function to generate an intermediate host-side hash result from the biometric reading and the host-side copy of the shared secret;
- using the outer hash function to generate a host-side hash result from the intermediate host-side hash result; and
- determining whether the sensor-side hash result matches the host-side hash result.

14. The secure-biometric-sensor system of claim 1, further comprising using a block cipher to encrypt the biometric reading using a first encryption key prior to the transmitting of the captured biometric reading to the host, wherein:
- the cryptographically entangled token comprises the encrypted biometric reading; and
- the transmitting of the cryptographically entangled token to the host comprises the transmitting of the captured biometric reading to the host.

15. The secure-biometric-sensor system of claim 14, wherein the shared secret is the first encryption key.

16. The secure-biometric-sensor system of claim 15, wherein the host attempting to authenticate the captured biometric reading as having been captured by the biometric sensor comprises the host:
- calculating a host-side copy of the shared secret from the cryptographic challenge; and
- using the host-side copy of the shared secret as a decryption key to decrypt the encrypted biometric reading.

17. The secure-biometric-sensor system of claim 14, further comprising:
- obtaining a random number, wherein the obtained random number is the first encryption key;
- generating an encrypted random number by encrypting the random number using the shared secret as a second encryption key; and
- transmitting the encrypted random number to the host.

18. The secure-biometric-sensor system of claim 17, wherein the host attempting to authenticate the captured biometric reading as having been captured by the biometric sensor comprises the host:
- calculating a host-side copy of the shared secret from the cryptographic challenge;
- obtaining the random number by using the host-side copy of the shared secret as a second decryption key to decrypt the encrypted random number; and
- using the obtained random number as a first decryption key to decrypt the encrypted biometric reading.

19. The secure-biometric-sensor system of claim 1, wherein the captured biometric reading comprises liveliness data.

20. A biometric sensor comprising:
- first and second communication interfaces via which the biometric sensor is configured to be communicatively interposed between a host and a secure element, the biometric sensor and the secure element being physically bound to one another; and
- sensor authentication logic that, when executed by at least one hardware processor of the biometric sensor, causes the biometric sensor to perform operations comprising:
  - receiving a cryptographic challenge from the host;
  - forwarding the cryptographic challenge to the secure element;
  - capturing a biometric reading using a biometric-sensing element;
  - transmitting the captured biometric reading to the host;
  - receiving a cryptographic response from the secure element, the cryptographic response having been calculated by the secure element based on the cryptographic challenge, the cryptographic response comprising a shared secret between the host and the secure element;
  - generating a cryptographically entangled token from a predetermined combination of reading-specific data and the shared secret, the reading-specific data comprising one or both of the biometric reading and data derived from the biometric reading; and
  - transmitting the cryptographically entangled token to the host for use by the host in attempting to authenticate the captured biometric reading as having been captured by the biometric sensor.

21. A method performed by a biometric sensor executing stored instructions, the method comprising:
- receiving a cryptographic challenge from a host, the biometric sensor being communicatively interposed between the host and a secure element, the biometric sensor and the secure element being physically bound to one another;
- forwarding the cryptographic challenge to the secure element;
- capturing a biometric reading using a biometric-sensing element;
- transmitting the captured biometric reading to the host;
- receiving a cryptographic response from the secure element, the cryptographic response having been calculated by the secure element based on the cryptographic challenge, the cryptographic response comprising a shared secret between the host and the secure element;
- generating a cryptographically entangled token from a predetermined combination of reading-specific data and the shared secret, the reading-specific data comprising one or both of the biometric reading and data derived from the biometric reading; and
- transmitting the cryptographically entangled token to the host for use by the host in attempting to authenticate the captured biometric reading as having been captured by the biometric sensor.

* * * * *